(12) United States Patent
Shemkunas et al.

(10) Patent No.: US 10,479,474 B2
(45) Date of Patent: Nov. 19, 2019

(54) FRICTION STIR WELDED WINGTIP TORQUE BOX

(71) Applicant: The Boeing Company, Chicago, IL (US)

(72) Inventors: Michael P. Shemkunas, Bellingham, WA (US); Kenneth D. Cominsky, Mukilteo, WA (US); Steven S. Heer, Lake Stevens, WA (US); David P. Heck, St. Charles, MO (US); Benjamin D. Smith, Maryland Heights, MO (US); John A. Baumann, St. Charles, MO (US); Matthew D. Uhlman, Kirkland, WA (US); Burke L. Reichlinger, Kent, WA (US); Eric E. Thomas, St. Charles, MO (US); James P. Dobberfuhl, Clinton, WA (US)

(73) Assignee: The Boeing Company, Chicago, IL (US)

( * ) Notice: Subject to any disclaimer, the term of this patent is extended or adjusted under 35 U.S.C. 154(b) by 356 days.

(21) Appl. No.: 15/209,974

(22) Filed: Jul. 14, 2016

(65) Prior Publication Data

US 2018/0015996 A1 Jan. 18, 2018

(51) Int. Cl.
*B64C 3/18* (2006.01)
*B23K 20/12* (2006.01)
(Continued)

(52) U.S. Cl.
CPC ............ *B64C 3/18* (2013.01); *B23K 20/1265* (2013.01); *B23K 20/2336* (2013.01); *B64C 3/26* (2013.01);
(Continued)

(58) Field of Classification Search
CPC ........... B64C 3/18; B64C 23/065; B64C 3/20; B64C 3/185; B64C 3/26; B64C 3/182;
(Continued)

(56) References Cited

U.S. PATENT DOCUMENTS

| 4,749,155 A | 6/1988 | Hammer et al. |
| 6,386,481 B1 * | 5/2002 | Kallinen ................... B64C 3/18 244/123.1 |

(Continued)

FOREIGN PATENT DOCUMENTS

| CA | 2529108 A1 | 6/2006 |
| EP | 0989920 A1 | 4/2000 |

(Continued)

OTHER PUBLICATIONS

"European Application Serial No. 17168891.4, Office Action dated Dec. 12, 2018", 7 pgs.

(Continued)

*Primary Examiner* — Valentina Xavier
(74) *Attorney, Agent, or Firm* — Kwan & Olynick LLP

(57) ABSTRACT

Provided are wingtip torque boxes and methods of fabricating such boxes using friction stir welding. Specifically, a wingtip torque box may be formed by friction stir welding two monolithic clamshells along their respective spars thereby forming a new monolithic structure. Use of the friction stir welding and monolithic clamshells simplifies the overall fabrication process and yields a robust wingtip torque box that can be bolted on or otherwise attached to an aircraft wing. The wingtip torque box may include internal grid stiffeners and/or external stiffeners that may be also monolithic with other components of the box. For example, the stiffeners may be machined in spars or skin portions of the clamshells during fabrication of clamshells. The wingtip torque box may have a continuous cavity extending between (Continued)

the ends and, in some embodiments, between spars of the box and providing access for performing various operations inside the box.

21 Claims, 15 Drawing Sheets

(51) Int. Cl.
   *B23K 20/233* (2006.01)
   *B64C 3/26* (2006.01)
   *C25D 11/04* (2006.01)
   *B23K 101/12* (2006.01)
   *B23K 103/10* (2006.01)

(52) U.S. Cl.
   CPC .......... *C25D 11/04* (2013.01); *B23K 2101/12* (2018.08); *B23K 2103/10* (2018.08)

(58) Field of Classification Search
   CPC ... B64F 5/10; B23K 20/1265; B23K 20/2336; B23K 2101/12; B23K 2103/10; C25D 11/04; Y02T 50/164
   See application file for complete search history.

(56) References Cited

U.S. PATENT DOCUMENTS

| | | | |
|---|---|---|---|
| 6,779,707 B2 | 8/2004 | Dracup et al. | |
| 6,986,452 B2 | 1/2006 | Dracup | |
| 7,182,293 B2* | 2/2007 | Sarh | B64C 3/18 244/123.14 |
| 7,347,351 B2 | 3/2008 | Slattery | |
| 8,172,179 B2* | 5/2012 | Crawford | B64C 3/187 244/123.7 |
| 8,506,201 B2 | 8/2013 | Slattery | |
| 9,015,948 B2 | 4/2015 | Talwar et al. | |
| 2001/0015043 A1* | 8/2001 | Brenneis | B64C 1/12 52/630 |
| 2005/0236524 A1 | 10/2005 | Sarh | |
| 2010/0037998 A1 | 2/2010 | Bray et al. | |
| 2014/0117158 A1 | 5/2014 | Davies et al. | |
| 2014/0138485 A1 | 5/2014 | Sanderson et al. | |
| 2015/0175252 A1 | 6/2015 | Batalla et al. | |
| 2015/0183506 A1* | 7/2015 | Garcia Martin | B32B 37/02 244/123.1 |

FOREIGN PATENT DOCUMENTS

| | | |
|---|---|---|
| EP | 1669288 A1 | 6/2006 |
| EP | 1525939 B1 | 4/2012 |
| EP | 2703283 A2 | 3/2014 |
| EP | 2815961 A1 | 12/2014 |
| WO | 2008152248 A2 | 12/2008 |

OTHER PUBLICATIONS

"European Application Serial No. 17168891.4, Search Report dated Oct. 23, 2017", 13 pgs.

Ahmadi, H. et al., "Influence of Pin Profile on Quality of Friction Stir Lap Welds in Carbon Fiber Reinforced Polypropylene Composite", International Journal of Mechanics and Applications 2 (3), 2012, pp. 24-28.

"European Application Serial No. 17168891.4, Office Action dated Aug. 14, 2019", 6 pgs.

* cited by examiner

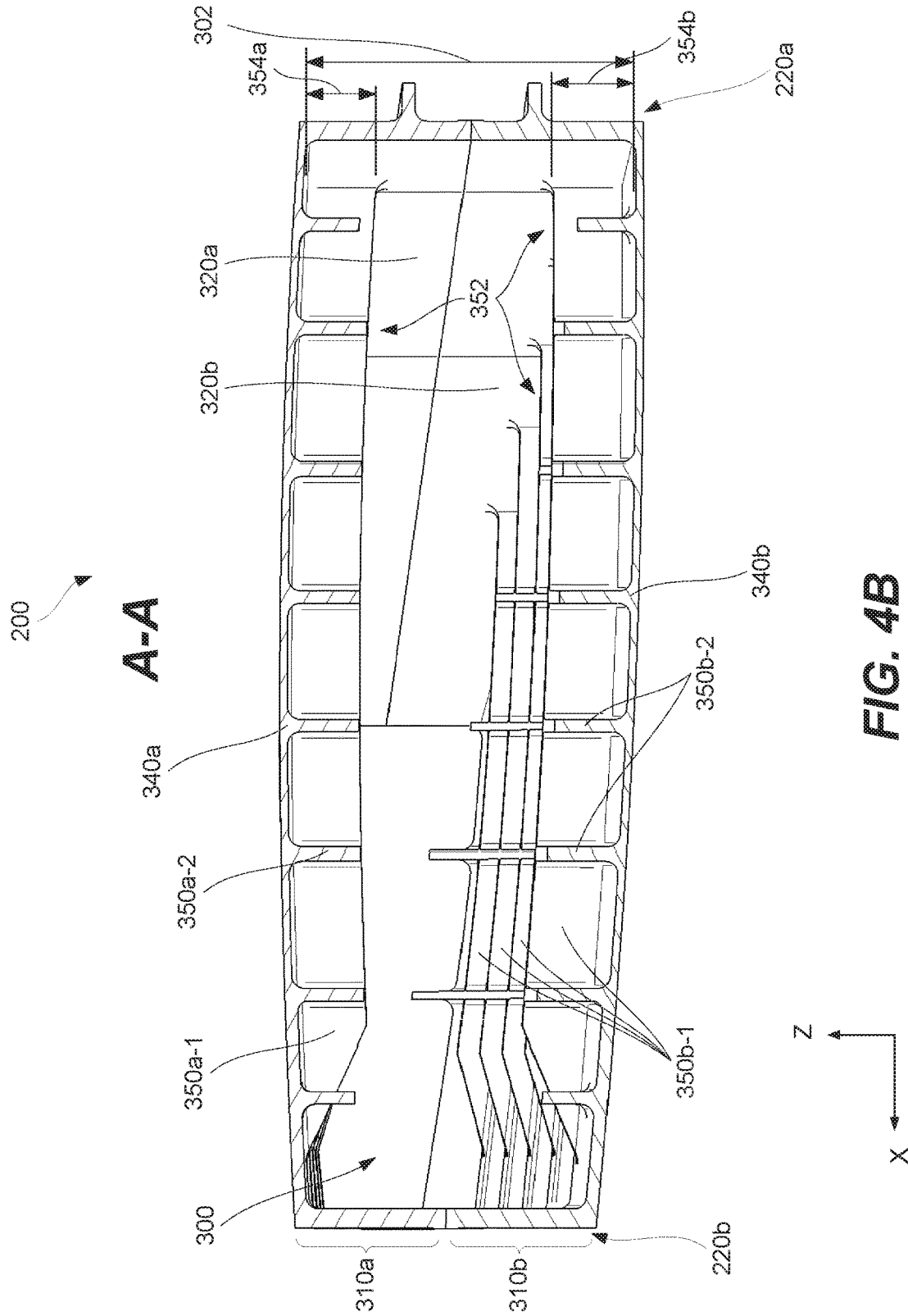

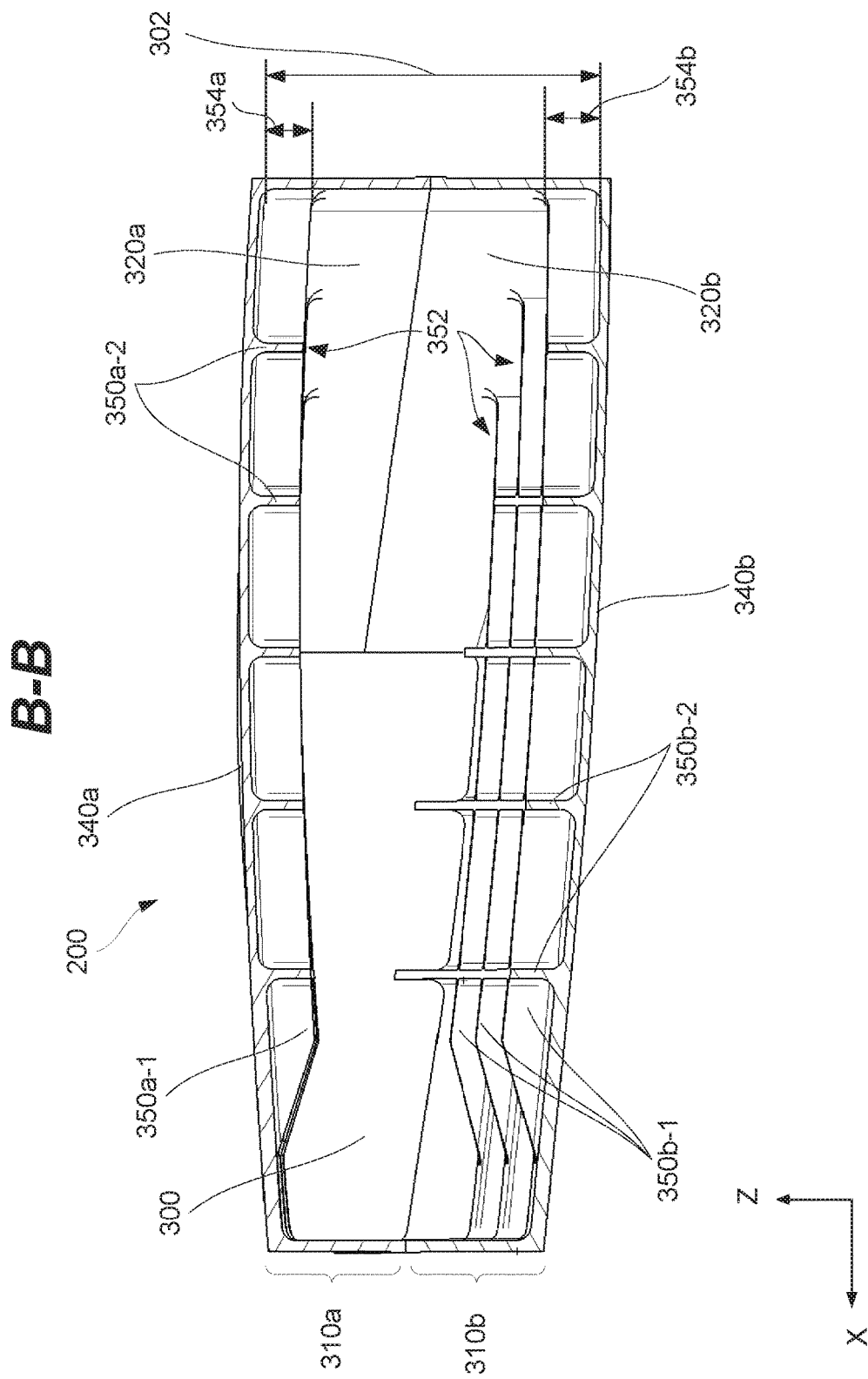

FRICTION STIR WELDED WINGTIP TORQUE BOX

BACKGROUND

A wingtip is a structure positioned at the end of a wing of a fixed-wing aircraft. It may be used to reduce the drag from vortices typically generated at the wing end, which, in turn, may help with fuel economy, aircraft stability, and other purposes. A wingtip may have various shapes included, but not limited to, a raked shape, a squared-off shape, a rounded shape, and the like. A wingtip may include a torque box, which bears the load of the wing. A conventional torque box is a built-up structure composed of many separate parts, such as spars, skins, ribs, and fasteners. These torque boxes can be complex and expensive to manufacture and may have drawbacks commonly associated with multicomponent assemblies, including; added weight, multiple part-to-part interfaces susceptible to corrosion, and limited access during installation, repair, or replacement.

SUMMARY

The following presents a simplified summary of the disclosure in order to provide a basic understanding of certain embodiments of this disclosure. This summary is not an extensive overview of the disclosure, and it does not identify key and critical elements of the present disclosure or delineate the scope of the present disclosure. Its sole purpose is to present some concepts disclosed herein in a simplified form as a prelude to the more detailed description that is presented later.

Provided are wingtip torque boxes and methods of fabricating such boxes using friction stir welding. Specifically, a wingtip torque box may be formed by friction stir welding two monolithic clamshells along their respective spars thereby forming a new monolithic structure. Use of the friction stir welding and monolithic clamshells simplifies the overall fabrication process and yields a robust wingtip torque box that can be bolted on or otherwise attached to an aircraft wing. The wingtip torque box may include internal grid stiffeners and/or external stiffeners that may be also monolithic with other components of the box. For example, the stiffeners may be machined in spars or skin portions of the clamshells during fabrication of clamshells. The wingtip torque box may have a continuous cavity extending between the ends and, in some embodiments, between spars of the box and providing access for performing various operations inside the box.

In some embodiments, a wingtip torque box comprises an upper monolithic clamshell and a lower monolithic clamshell. The upper monolithic clamshell may comprise an upper front spar, an upper rear spar, and an upper skin portion extending between the upper front spar and the upper rear spar. The lower monolithic clamshell may comprise a lower front spar, a lower rear spar, and a lower skin portion extending between the lower front spar and the lower rear spar. The upper monolithic clamshell and the lower monolithic clamshell may form a cavity. The upper front spar may be friction stir welded to the lower front spar at a front friction stir welded joint. Likewise, the upper rear spar may be friction stir welded to the lower rear spar at a rear friction stir welded joint. In some embodiments, the wingtip torque box is monolithic. Alternatively, the wingtip torque box may include one or more components that are riveted or otherwise attached to a monolithic subassembly of the clamshells.

In some embodiments, the upper monolithic clamshell comprises upper internal grid stiffeners extending from the upper skin portion to the cavity. Likewise, the lower monolithic clamshell comprises lower internal grid stiffeners extending from the lower skin portion to the cavity. The cavity is defined by ends of the upper internal grid stiffeners and the lower internal grid stiffeners. In some embodiments, the cavity has a height greater than a height of the upper internal grid stiffeners or a height of the lower internal grid stiffeners. In some embodiments, the upper internal grid stiffeners and the lower internal grid stiffeners are both orthogrid stiffeners. In some embodiments, the upper internal grid stiffeners and the lower internal grid stiffeners extend between a tip end and a wing end of the wingtip torque box.

In some embodiments, the upper monolithic clamshell comprises upper external stiffeners extending from the upper front spar away from the cavity. Likewise, the lower monolithic clamshell comprises lower external stiffeners extending from the lower front spar away from the cavity. In some embodiments, the upper external stiffeners comprise upper vertical portions extending perpendicular to the front friction stir welded joint. Likewise, the lower external stiffeners may comprise lower vertical portions extending perpendicular to the front friction stir welded joint. In some embodiments, each of the upper vertical portions is collinear to one of the lower vertical portions.

In some embodiments, the upper external stiffeners further comprise an upper horizontal portion extending parallel to the front friction stir welded joint. Likewise, the lower external stiffeners further comprise a lower horizontal portion extending parallel to the front friction stir welded joint. In some embodiments, the upper horizontal portion bridges the upper vertical portions, while the lower horizontal portion bridges the lower vertical portions.

In some embodiments, the upper skin portion and the lower skin portion define an airfoil shape of the wingtip torque box. When the wingtip torque box is installed on the aircraft, the upper skin portion and the lower skin portion may be parts of the overall external surface of the aircraft.

In some embodiments, the cavity is continuous between a combination of the upper front spar and the lower front spar and a combination of the upper rear spar and the lower rear spar. In some embodiments, the cavity is continuous between a tip end and a wing end of the wingtip torque box. This continuity ensures access through the wingtip torque box during its installation, maintenance, and other operations.

In some embodiments, the upper monolithic clamshell comprises an upper wing attachment plate. Likewise, the lower monolithic clamshell may comprise a lower wing attachment plate. Each of the upper wing attachment plate and the lower wing attachment plate may comprise fastener openings.

In some embodiments, each of the fastener openings comprises a first cylindrical opening extending substantially perpendicular to a plane defined by the upper wing attachment plate or by the lower wing attachment plate. Each of the fastener openings may further comprises a second cylindrical opening extending substantially perpendicular to a plane defined by the upper skin portion or by the lower skin portion.

In some embodiments, the upper wing attachment plate and the lower wing attachment plate are coplanar. In some embodiments, the upper wing attachment plate and the lower wing attachment plate are substantially perpendicular to the front friction stir welded joint and to the rear friction stir welded joint.

In some embodiments, the wingtip torque box comprises aluminum. In some embodiments, a material composition of the wingtip torque box is substantially uniform throughout an entire volume of the wingtip torque box.

Provided also is a method of fabricating a wingtip torque box. The method may comprise aligning an upper monolithic clamshell and a lower monolithic clamshell relative to each other. In some embodiments, the upper monolithic clamshell comprises an upper front spar, an upper rear spar, and an upper skin portion extending between the upper front spar and the upper rear spar. In some embodiments, the lower monolithic clamshell comprises a lower front spar, a lower rear spar, and a lower skin portion extending between the lower front spar and the lower rear spar. After aligning, the upper front spar may contact the lower front spar at all locations between a wing end and a tip end, and the upper rear spar may contact the lower rear spar at all locations between a wing end and a tip end.

In some embodiments, method further comprises friction stir welding the upper front spar and the lower front spar thereby forming a front friction stir welded joint extending between the wing end and the tip end. In some embodiments, method further comprises friction stir welding the upper rear spar and the lower rear spar thereby forming a rear friction stir welded joint extending between the wing end and the tip end.

In some embodiments, friction stir welding the upper front spar and the lower front spar and friction stir welding the upper rear spar and the lower rear spar are performed in sequence. In other embodiments, friction stir welding the upper front spar and the lower front spar at least partially overlaps in time with friction stir welding the upper rear spar and the lower rear spar.

In some embodiments, method further comprises removing an end of the upper front spar and an end of the lower front spar corresponding to a path end of friction stir welding, after friction stir welding the upper front spar and the lower front spar. In some embodiments, method further comprises forming fastener openings in an upper wing attachment plate of the upper monolithic clamshell and in a lower wing attachment plate of the lower monolithic clamshell. In some embodiments, method further comprises anodizing the wingtip torque box, after friction stir welding.

In some embodiments, after aligning, the upper monolithic clamshell and the lower monolithic clamshell form a cavity. In some embodiments, after friction stir welding the upper front spar and the lower front spar and after friction stir welding the upper rear spar and the lower rear spar, the wingtip torque box is monolithic.

In some embodiments, the upper monolithic clamshell comprises upper internal grid stiffeners extending from the upper skin portion to the cavity, and the lower monolithic clamshell may comprise lower internal grid stiffeners extending from the lower skin portion to the cavity. The cavity may be defined by ends of the upper internal grid stiffeners and the lower internal grid stiffeners. In some embodiments, the cavity has a height greater than a height of the upper internal grid stiffeners or a height of the lower internal grid stiffeners.

In some embodiments, the upper internal grid stiffeners and the lower internal grid stiffeners are both orthogrid stiffeners. In some embodiments, the upper internal grid stiffeners and the lower internal grid stiffeners extend between a tip end and a wing end of the wingtip torque box.

In some embodiments, the upper monolithic clamshell comprises upper external stiffeners extending from the upper front spar away from the cavity, and the lower monolithic clamshell may comprise lower external stiffeners extending from the lower front spar away from the cavity. In some embodiments, the upper external stiffeners comprise upper vertical portions extending perpendicular to the front friction stir welded joint, and the lower external stiffeners may comprise lower vertical portions extending perpendicular to the front friction stir welded joint. In some embodiments, each of the upper vertical portions is collinear to one of the lower vertical portions.

In some embodiments, the upper external stiffeners further comprise an upper horizontal portion extending parallel to the front friction stir welded joint. The lower external stiffeners may further comprise a lower horizontal portion extending parallel to the front friction stir welded joint. In some embodiments, the upper horizontal portion may bridge the upper vertical portions, and the lower horizontal portion may bridge the lower vertical portions.

In some embodiments, the upper skin portion and the lower skin portion define an airfoil shape of the wingtip torque box. In some embodiments, a material composition of the wingtip torque box is substantially uniform throughout an entire volume of the wingtip torque box.

These and other embodiments are described further below with reference to the figures.

BRIEF DESCRIPTION OF THE DRAWINGS

FIGS. 4A-4C are schematic cross-sectional views of a wingtip torque box showing its internal structures, in accordance with some embodiments.

DETAILED DESCRIPTION

Figure 1:
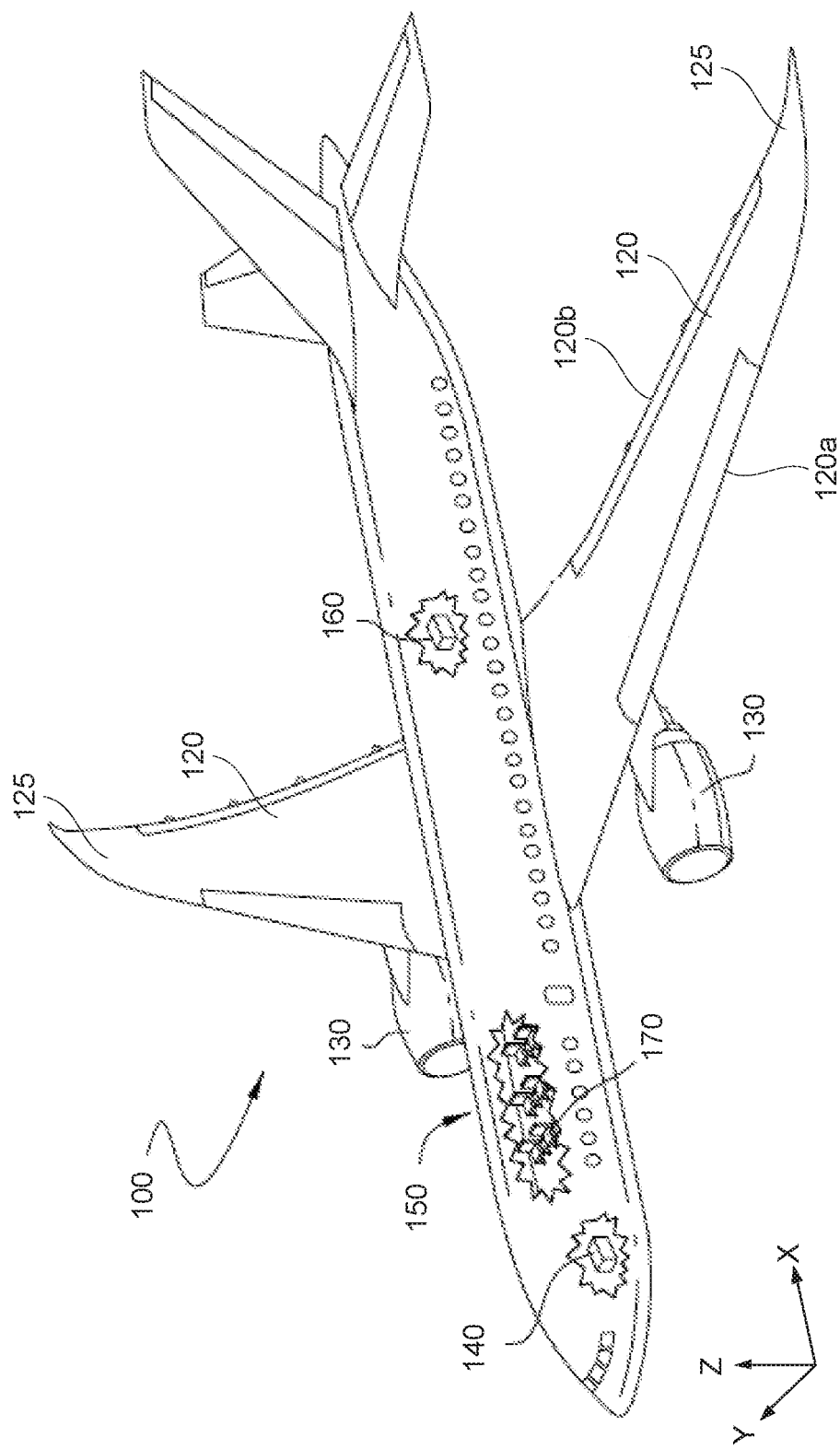
FIG. 1 is a schematic illustration of an aircraft showing wingtips, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting. On the contrary, it is intended to cover alternatives, modifications, and equivalents as may be included within the spirit and scope of the present disclosure as defined by the appended claims.

For example, the techniques of the present disclosure will be described in the context of particular aircraft structures, such as wingtips of aircraft wings. However, it should be noted that the techniques and mechanisms of the present disclosure apply to various other end structures of vehicle components. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure. Various techniques and mechanisms of the present disclosure will sometimes be described in singular form for clarity. However, it should be noted that some embodiments include multiple iterations of a technique or multiple instantiations of a mechanism unless noted otherwise.

Introduction

The present disclosure describes a novel wingtip torque box with improved monolithic design, fabricating techniques, and attachment to main wing structures of an aircraft. The wing torque box is assembled by friction stir welding of two monolithic clamshells thereby forming a single monolithic structure. The monolithic design of this wingtip torque box has many advantages in comparison with conventional torque boxes formed by fastening multiple different components. For example, the disclosed wingtip torque box may be more structurally sound and have longer operating lifetime because of its monolithic design. There are effectively no interfaces in the disclosed design, thus minimizing potential sites of breakage or corrosion. One having ordinary skill in the art would recognize that part-to-part interfaces and fasteners used to support these interfaces can introduce additional design concerns in many structures in particular aircraft assemblies, such as wing assemblies. Furthermore, the wingtip torque box with monolithic design is much simpler to manufacture resulting in fewer fabrication issues and lower cost thereby allowing more frequent replacement of torque boxes and maintain higher safety levels. Finally, the wingtip torque box with monolithic design may have a continuous internal cavity, which may be used for access. Overall, the monolithic nature of each clamshell, and corresponding components, may result in increased structural strength, lower weight, and/or reduced costs.

According to various embodiments, each monolithic clamshell is machined from a single metal block, such as aluminum or other suitable metal. Each clamshell may include a front spar, a rear spar, and a skin portion extending between the front spar and the rear spar. The skin portion of each clamshell may define an airfoil profile of the aircraft wing. The spars or, more specifically, spar edges are used for friction stir welding of the two monolithic clamshells.

Each clamshell may additionally include internal grid stiffeners that may be arranged in an orthogrid configuration or some other suitable configuration. The internal grid stiffeners may extend in the same direction as the spars but may be shorter. As such, a cavity may be formed between edges of the internal grid stiffeners, and this cavity may be used for access. Each clamshell may include external stiffeners coupled to the front spar.

The clamshells may be aligned such that the front spars contact each other at all points from the wing end to the tip end. This may be referred to as a front butt configuration. Likewise, the rear spars of the two clamshell contact each other at all points between the ends forming a rear butt configuration. Each butt configuration is then friction stir welded to form a front friction stir weld joint uniting the two front spars and a rear friction stir weld joint uniting the two rear spars. It should be noted that both of these friction stir weld joints are monolithic with each other since each clamshell is monolithic. In some embodiments, friction stir welding the front spars and friction stir welding the rear spars may be performed in sequence, simultaneously, or at least partially at simultaneously. In some embodiments, the torque box may also be a monolithic structure after friction stir welding of the two clamshells. In other words, no other components besides monolithic clamshells may be used to form the torque box or these components are also friction stir welded to the clamshells.

To better understand various aspects of wingtip air boxes, a brief description of an aircraft and aircraft wing is now presented. FIG. 1 is a schematic illustration of aircraft 100, in accordance with some embodiments. As depicted in FIG. 1, aircraft 100 is defined by a longitudinal axis (X-axis), a lateral axis (Y-axis), and a vertical axis (Z-axis). In various embodiments, aircraft 100 comprises airframe 150 with interior 170. Aircraft 100 includes wings 120 coupled to airframe 150. Each wing 120 may be defined by leading wing edge 120a and trailing wing edge 120b. Each wing 120 may further include wingtip 125 comprising a portion of each wing 120 that is most distant from airframe 150. Aircraft 100 also includes engines 130 supported by wings 120. In some embodiments, aircraft 100 further includes a number of high-level inspection systems 140 and 160, further described below in conjunction with FIG. 9. Aircraft 100 shown in FIG. 1 is one example of a vehicle in which a friction stir welded torque box, such as torque box 200, may be implemented to form the structure of wingtip 125 of wings 120, in accordance with an illustrative embodiment.

Figure 2:
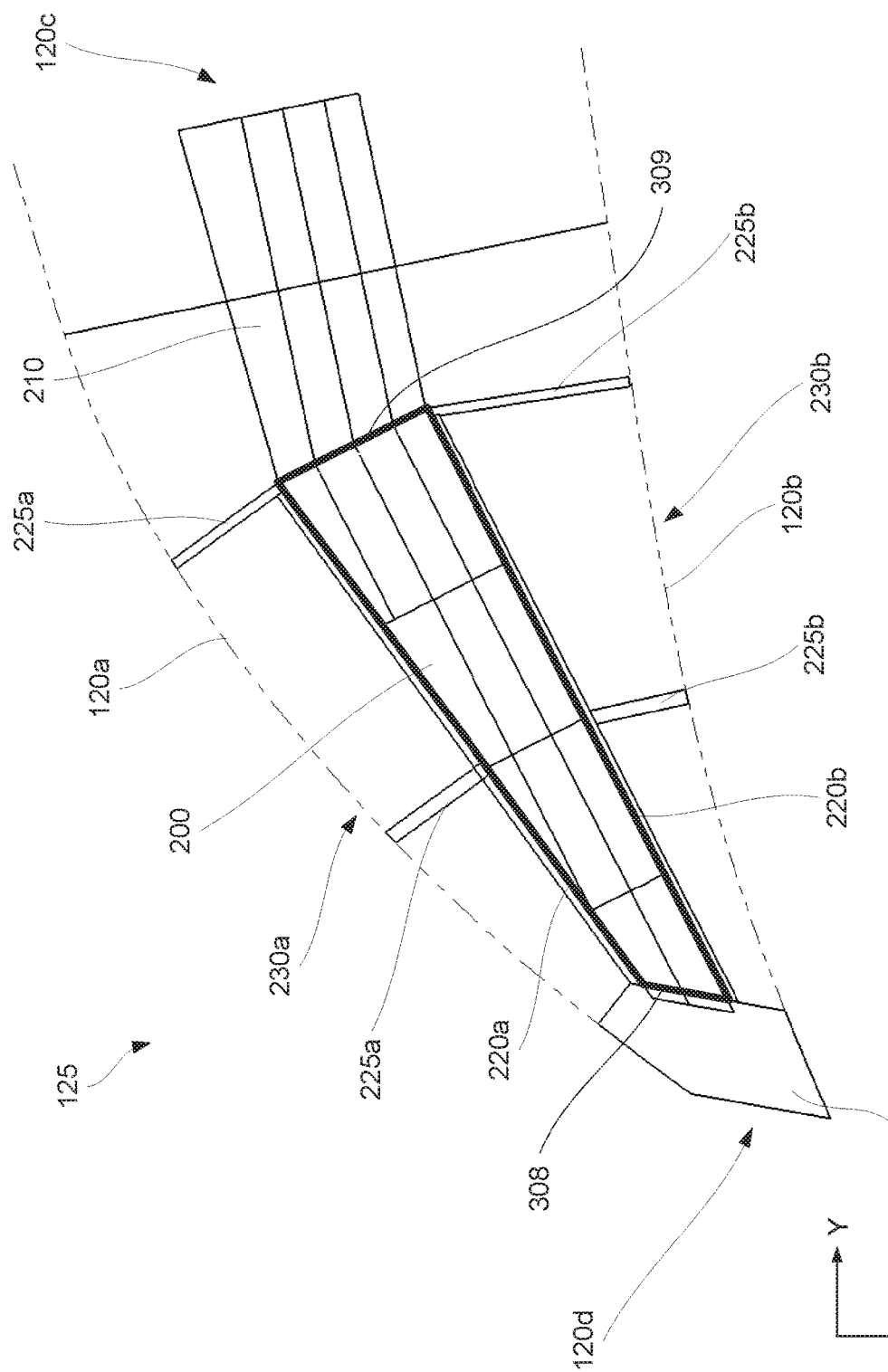
FIG. 2 is a schematic top cross sectional view of a wingtip showing a torque box, in accordance with some embodiments.

FIG. 2 is a schematic top cross-sectional view of wingtip 125 portion of wing 120 including torque box 200, in accordance with some embodiments. Wingtip 125, like wing 120, may be a semi-hollow structure having an interior space. Wingtip 125 may be defined by leading wing edge 120a, trailing wing edge 120b, inboard end 120c, and outboard end 120d of wing 120. Torque box 200 of wingtip 125 may be defined by leading box edge 220a, trailing box edge 220b, tip end 308, and wing end 309. Wingtip 125 may further include closeout fitting 223 at tip end 125d to seal the end of wingtip 125. In various embodiments, the shape of wingtip 125 may influence the size and drag of the wingtip vortices, and wingtip 125 may comprise any of a diversity of shapes, including, but not limited to, squared-off, aluminum tube bow, rounded, hoerner style, wingless, drooped tips, raked wingtips, tip tanks, sails, fences, and end plates.

Wingtip 125 may include further structures attached to torque box 200, such as ribs and extensions of skin portions, forming airfoil profile 230a at leading wing edge 120a and airfoil profile 230b at trailing wing edge 120b. For example, one or more leading edge ribs 225a may be coupled to leading box edge 220a of torque box 200. Furthermore, one or more trailing edge ribs 225b may be coupled to trailing box edge 220b of torque box 200. Like other structural ribs and spars, leading edge ribs 225a and trailing edge ribs 225b may contribute to the cambered shape and airfoil profile 230a and 230b of wing 120, and distribute the load from the skin.

In some embodiments, wing 120 may include one or more internal wing structures 210 such as rib structures extending from leading wing edge 120a to trailing wing edge 120b of wing 120. Internal structures 210 may further include spar structures extending along the length of wing 120 from inboard end 120c to outboard end 120d of wing 120. Torque box 200 may be coupled to such rib and/or spar structures 210 in order to secure wingtip 125 onto wing 120 as further described below with reference to FIGS. 8A-8B. In other embodiments, internal structures 210 may further include stringers, drag wires, anti-drag wires, tire rods, etc.

Examples of Wingtip Torque Boxes

Figure 3A:
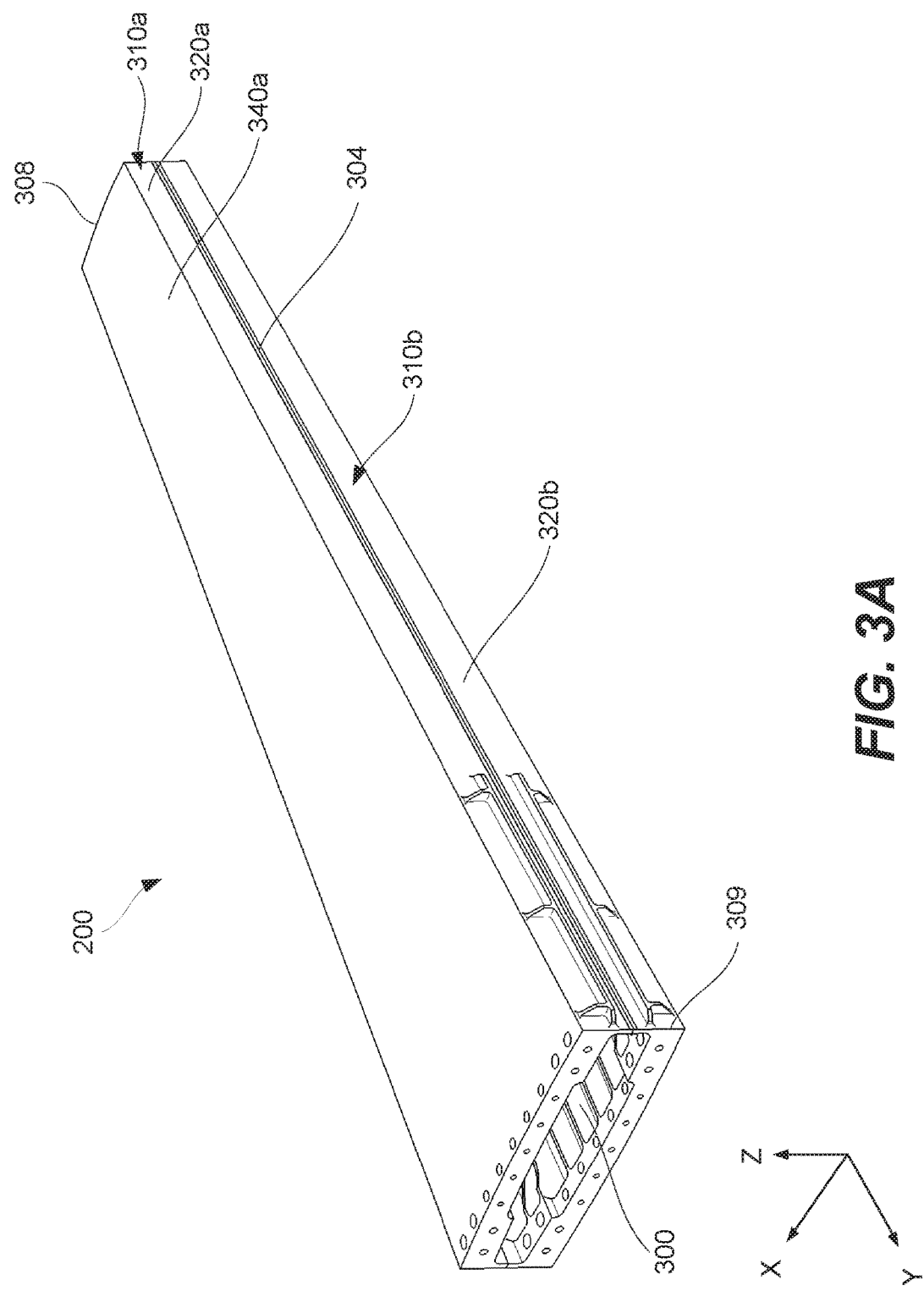
FIGS. 3A-3B are schematic perspective views of a wingtip torque box, in accordance with some embodiments.
Figure 3B:
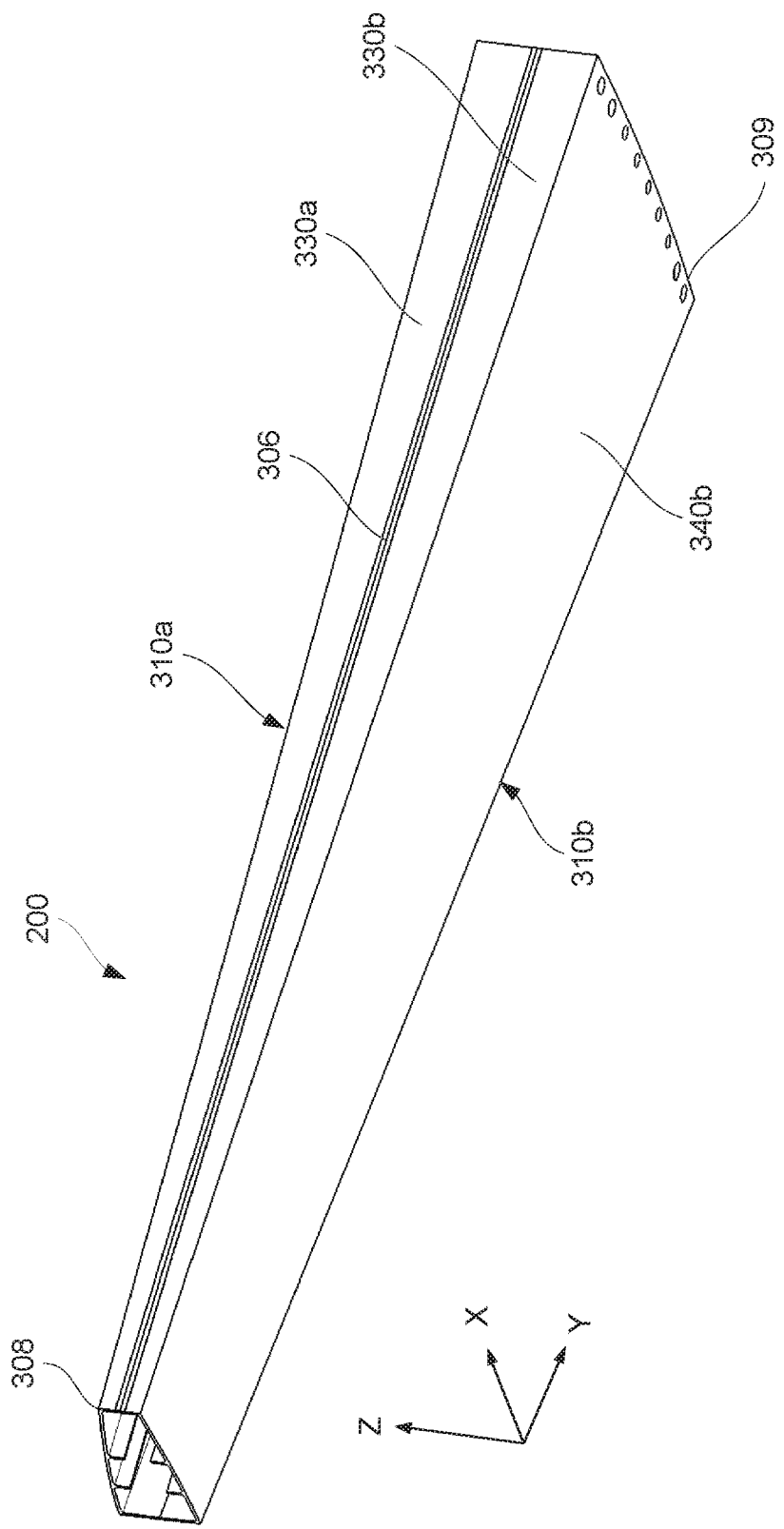
Figure 3C:
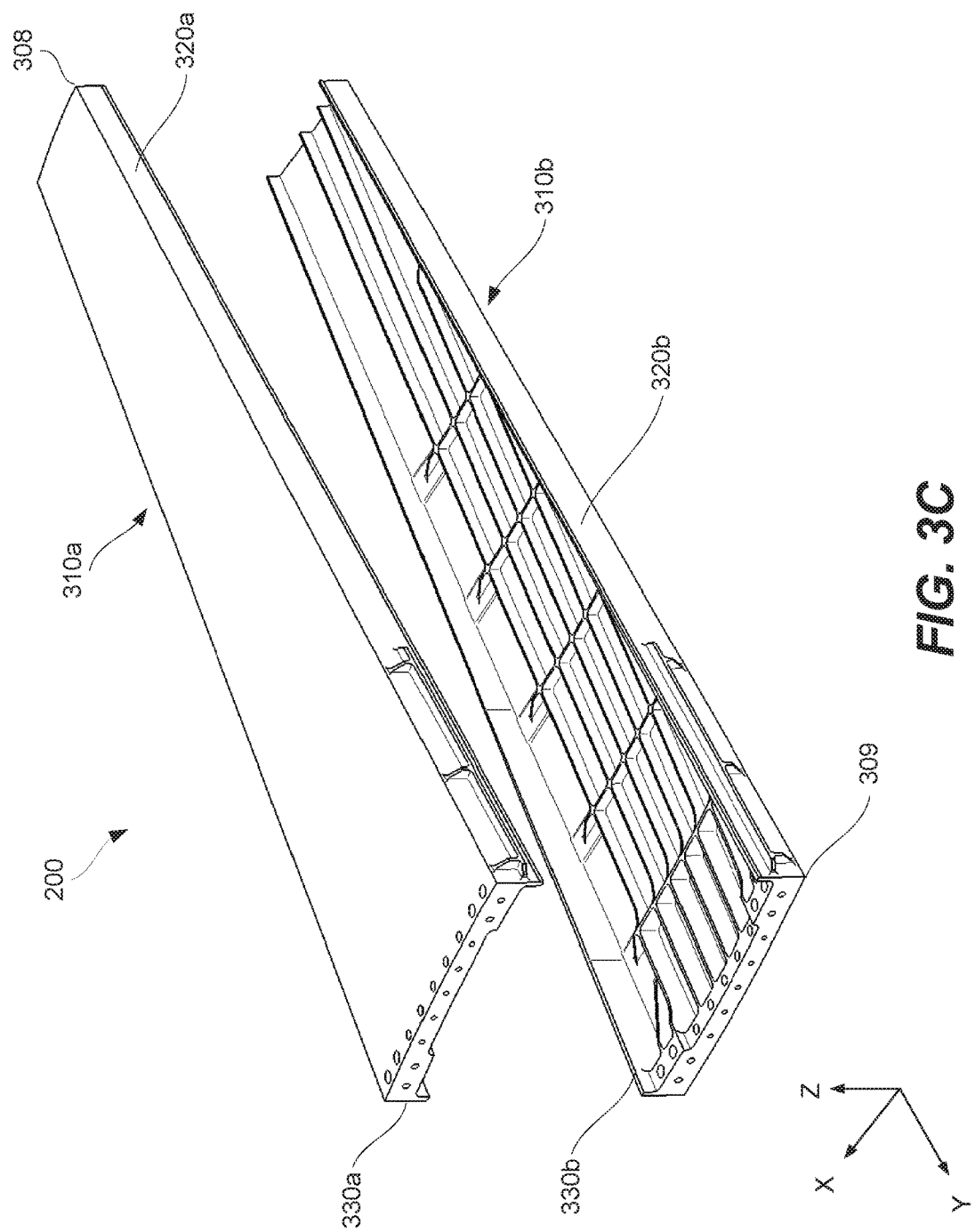
FIG. 3C is a schematic exploded view of a wingtip torque box, in accordance with some embodiments.

FIGS. 3A-3D are schematic perspective views of wingtip torque box 200, in accordance with some embodiments. Specifically, FIG. 3A is a perspective view showing upper skin portion 340a, wing end 309, and front spar portions of torque box 200. FIG. 3B is a view showing lower skin portion 340b, tip end 308, and rear spar portions of torque box 200. FIG. 3C is a schematic exploded view of wingtip torque box 200, in accordance with some embodiments.

In various embodiments, wingtip torque box 200 comprises upper clamshell 310a and lower clamshell 310b. In some embodiments, upper clamshell 310a and lower clamshell 310b may each be monolithic structures formed of a single piece of material. In some embodiments, wingtip torque box 200 comprises aluminum. In other embodiments, wingtip torque box 200 may comprise any of various materials including other suitable metals, plastics, or other suitable materials that can be friction stir welded and provide the desired strength, flexibility, durability, weight, water resistance, or other desired physical characteristic. In some embodiments, the material composition of wingtip torque box 200 may be substantially uniform throughout the entire volume of wingtip torque box 200.

In some embodiments, upper clamshell 310a comprises upper front spar 320a, upper rear spar 330a, and upper skin portion 340a that extends between upper front spar 320a and upper rear spar 330a. Likewise, lower clamshell 310b comprises lower front spar 320b, lower rear spar 330b, and lower skin portion 340b extending between lower front spar 320b and lower rear spar 330b. FIG. 3C shows upper clamshell 310a and lower clamshell 310b as separate structures showing orientation of front spars 320a and 320b. In some embodiments, upper clamshell 310a and lower clamshell 310b may be enantiomorphic objects. In other words, upper clamshell 310a and lower clamshell 310b are mirror image structures reflected along a plane defined by the X-axis and Y-axis. As mirror image structures, upper clamshell 310a and lower clamshell 310b may include the same corresponding structures and/or components further described below, but cannot be superposed.

Upper clamshell 310a and lower clamshell 310b may be joined together by friction stir welding processes. Friction stir welding is a solid-state joining process (where the metal of joined structure is softened but not melted) that uses a third body tool (i.e., friction stir welding tool) to join two components. Heat is generated between the friction stir welding tool and the welded components resulting in softening of a region near the friction stir welding tool. The friction stir welding tool then mechanically intermixes materials the two components thereby forming a friction stir welding joint. The softened and intermixed material can be compressed using external pressure, e.g., applied by the friction stir welding tool. It is important to note that friction stir welding forms a monolithic assembly from upper clamshell 310a and lower clamshell 310b.

In some embodiments, upper front spar 320a is friction stir welded to lower front spar 320b at front friction stir welded joint 304. Similarly, upper rear spar 330a may be friction stir welded to lower rear spar 330b at rear friction stir welded join 306. In some embodiments, wingtip torque box 200 is a monolithic structure after upper clamshell 310a and lower clamshell 310b are friction stir welded together.

In various embodiments, cavity 300 is a hollow space formed by upper clamshell 310a and lower clamshell 310b as shown in FIGS. 3A, 4B, and 4C. Cavity 300 may be a continuous space between a first joined structure, formed by upper front spar 320a and lower front spar 320b, and a second joined structure formed by upper rear spar 330a and lower rear spar 330b. Cavity 300 may further be continuous between tip end 308 and wing end 309 of torque box 200. In some embodiments, tip end 308 and wing end 309 may each include openings allowing access into cavity 300.

In some embodiments, upper skin portion 340a and lower skin portion 340b are continuous smooth surfaces. Upper skin portion 340a and lower skin portion 340b may include a curved or other appropriate shape that defines an airfoil shape of wingtip torque box 200. In some embodiments, upper skin portion 340a and lower skin portion 340b may form the outer surface of wingtip 125 and may be continuous with the outer surface of wing 120.

Figure 3D:
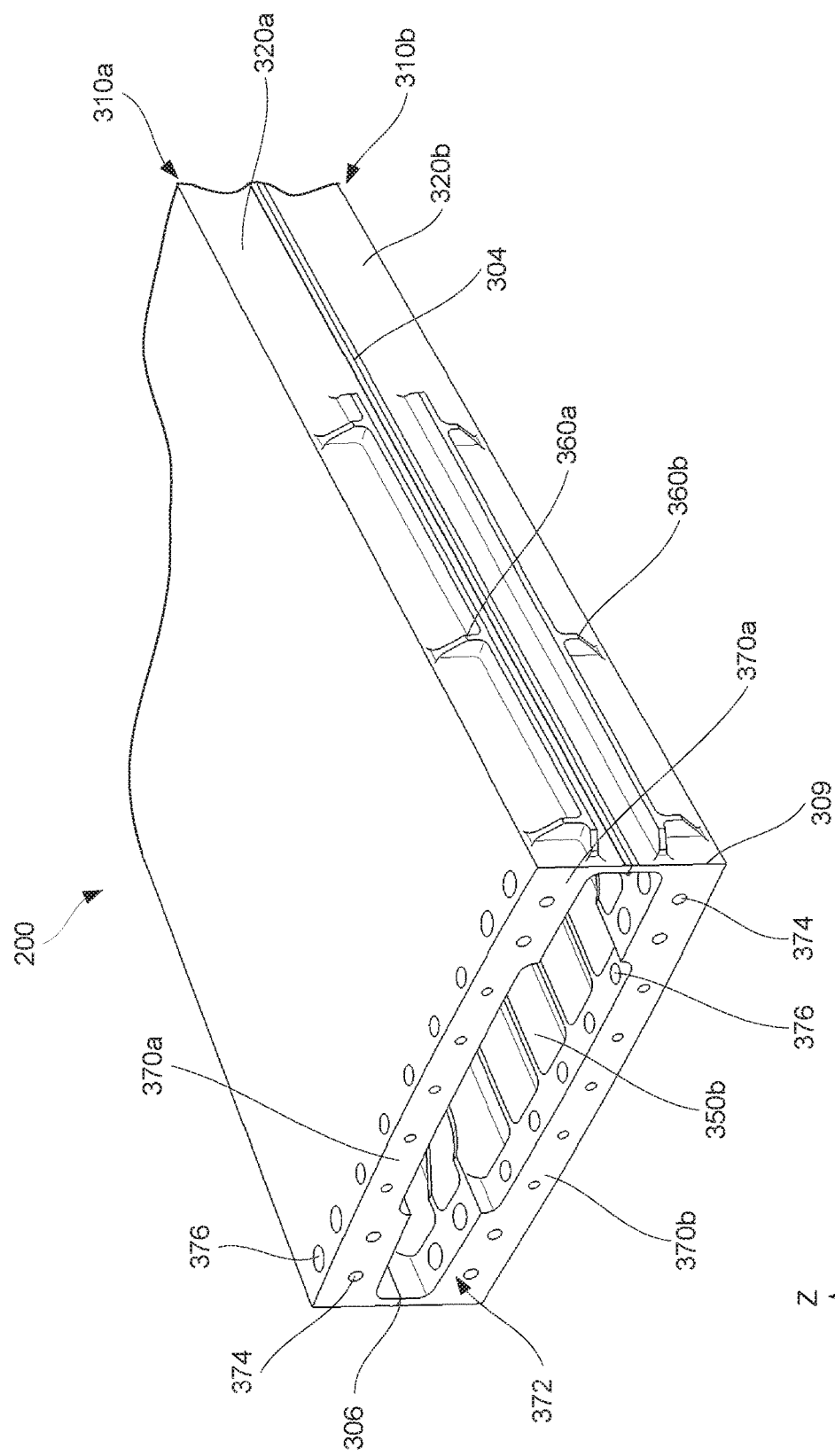
FIG. 3D is a detailed view of the wing end and front spar portions of a wingtip torque box, in accordance with some embodiments.

FIG. 3D is a detailed view of wing end 309 and front spar portions of a wingtip torque box 200, in accordance with some embodiments. Torque box 200 further includes lower internal grid stiffeners 350b within cavity 300 that add structural support. Upper internal grid stiffeners 350a and lower internal grid stiffeners 350b are further described below with reference to FIGS. 4A-4C and FIGS. 7A-7B. As further depicted in FIG. 3D, upper front spar 320a includes upper external stiffeners 360a, and lower front spar 320b includes lower external stiffeners 360b. In some embodiments, external stiffeners 360a and 360b provide additional structural support, as well as attachment points for various wing structures. In some embodiments, additional external stiffeners may be included on rear spars 330a and/or 330b. Upper external stiffeners 360a and lower external stiffeners 360b are further described below with reference to FIG. 5.

As further depicted in FIG. 3l), torque box 200 includes vertical attachment surfaces at wing end 309, including upper wing attachment plate 370a and lower wing attachment plate 370b. In some embodiments, upper wing attachment plate 370a and lower wing attachment plate 370b are coplanar. An external co-planar surface of upper wing attachment plate 370a and lower wing attachment plate 370b may be operable as a closeout rib or, more specifically, a stiffener closeout rib that may be also used for attachment of torque box to various other components. Furthermore, upper wing attachment plate 370a and the lower wing attachment plate 370b are substantially perpendicular to the front friction stir welded joint 304 and to the rear friction stir welded joint 306. In some embodiments, torque box 200 may also include vertical structures, like wing attachment plates 370a and 370b, at tip end 308.

In some embodiments, upper wing attachment plate 370a and lower wing attachment plate 370b include one or more fastener openings 372. Each fastener openings 372 may comprise lateral opening 374 and vertical opening 376. Lateral opening 374 may be a cylindrical cavity running along the lateral Y-axis within clamshells 310a and/or 310b with an opening facing the vertical face of wing attachment plates 370a and/or 370b. In some embodiments, lateral opening 374 extends substantially perpendicular to a plane defined by upper wing attachment plate 370a or lower wing attachment plate 370b.

Vertical opening 376 may be a cylindrical cavity running along the vertical Z-axis within clamshells 310a and/or 310b. In some embodiments, vertical opening 376 extends substantially perpendicular to a plane defined by upper skin portion 340a or by lower skin portion 340b. In some embodiments, an opening of vertical opening 376 may face the outer surface of upper skin portion 340a and/or lower skin portion 340b. In some embodiments, vertical opening 376 may extend completely through clamshells 310a and/or 310b and be continuous through skin portions 340a and/or 340b to cavity 300.

In various embodiments, the cavities of lateral openings 374 may perpendicularly intersect with the cavities of vertical openings 376 such that torque box 200 may be attached to various internal wing structures 210 using various hardware connections, such as a barrel nut and bolt system, through fastener openings 372. Upper wing attachment plate 370a and lower wing attachment plate 370b are further described below with reference to FIGS. 8A-8B.

Interior Structures of a Wingtip Torque Box

Figure 4A:
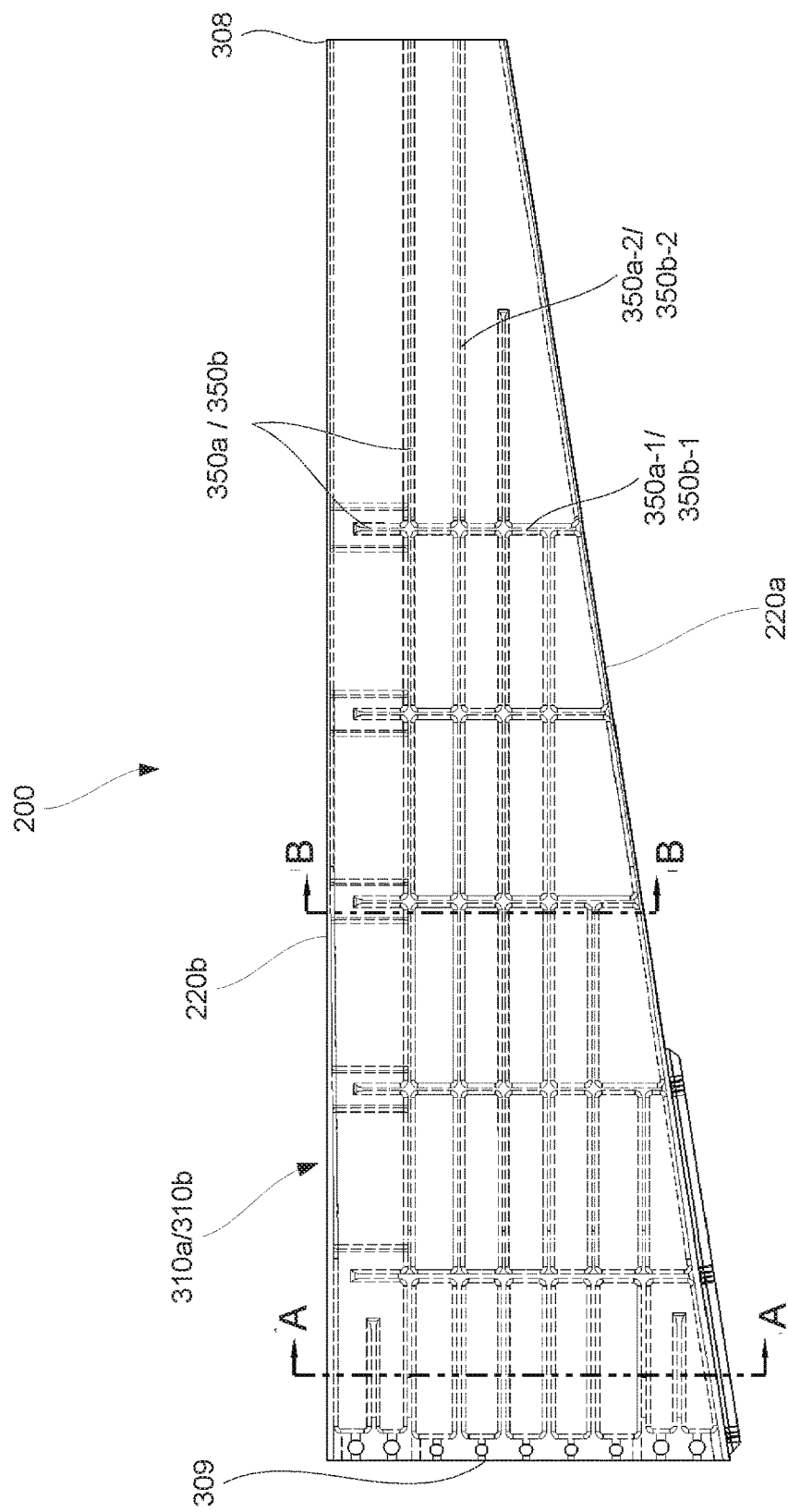

FIGS. 4A-4C are schematic cross-sectional views of a wingtip torque box showing internal structures, in accordance with some embodiments. FIG. 4A depicts a top cross-sectional view of torque box 200 showing internal structures of upper clamshell 310a and lower clamshell 310b. In this view, upper clamshell 310a is positioned directly over lower clamshell 310b and positions of various components of these clamshells may coincide.

To improve mechanical strength, torque box 200 includes internal grid stiffeners 350a and 350b. Upper internal grid stiffeners 350a are parts of upper clamshell 310a, while lower internal grid stiffeners 350b are parts of lower clamshell 310b. In some embodiments and as shown in FIG. 4A, internal grid stiffeners 350a and 350b are orthogrid stiffeners comprising protrusions arranged longitudinally along the X-axis and laterally along the Y-axis, forming a rectangular grid of support structures within the interior of each of internal grid stiffeners 350a are parts of upper clamshell 310a. Alternatively, internal grid stiffeners 350a and 350b may have other arrangements. For example, internal grid stiffeners 350a and/or 350b may be isogrid stiffeners arranged in a triangular pattern on upper clamshell 310a and/or lower clamshell 310b, respectively.

As shown in FIG. 4A, upper internal grid stiffeners 350a include upper longitudinal grid stiffeners 350a-1 that run longitudinally along the X-axis from leading box edge 220a to trailing box edge 220b. Upper internal grid stiffeners 350a further include upper latitudinal grid stiffeners 350a-2 that run laterally along the Y-axis from wing end 309 to tip end 308. Similarly, lower internal grid stiffeners 350b include lower longitudinal grid stiffeners 350b-1 that run longitudinally along the X-axis from leading box edge 220a to trailing box edge 220b. Lower internal grid stiffeners 350b further include lower latitudinal grid stiffeners 350b-2 that run laterally along the Y-axis from wing end 309 to tip end 308. In various embodiments, longitudinal grid stiffeners 350a-1 and/or 350b-1 are parallel relative to each other, while latitudinal grid stiffeners 350a-2 and/or 350b-2 are parallel relative to each other. In the view shown in FIG. 4A, longitudinal grid stiffeners 350a-1 and/or 350b-1 and latitudinal grid stiffeners 350a-2 and/or 350b-2 coincide respectively.

In other embodiments, some longitudinal grid stiffeners 350a-1 and/or 350b-1 may be arranged parallel to leading box edge 220a, while other longitudinal grid stiffeners 350a-1 and/or 350b-1 may be arranged parallel to trailing box edge 220b, when leading box edge 220a is not parallel to trailing box edge 220b. Overall, various orientations of longitudinal grid stiffeners 350a-1 and/or 350b-1 and latitudinal grid stiffeners 350a-2 and/or 350b-2 are possible. The orientations may depend on structural requirements of wingtip torque box 200 and other considerations.

FIG. 4B depicts a lateral cross-section of torque box 200 formed by upper clamshell 310a and lower clamshell 310b, from the A-A viewpoint from wing end 309 to tip end 308 (identified in FIG. 4A) at a point nearer to wing end 309. FIG. 4C depicts a lateral cross-section of torque box 200 formed by upper clamshell 310a and lower clamshell 310b, from the B-B viewpoint from wing end 309 to tip end 308 (identified in FIG. 4A) at a point nearer tip end 308. Due to the angle of leading box edge 220a relative to trailing box edge 220b, front friction stir weld joint 304 between upper front spar 320a and lower front spar 320b is visible in FIGS. 4B and 4C. Furthermore, because of the curvature of lower skin portion 340b, multiple lower longitudinal grid stiffeners 350b-1 are visible in FIGS. 4B and 4C. In some embodiments, upper skin portion 340a may have a similar curvature, but other upper longitudinal grid stiffeners 350a-1 are not visible in FIGS. 4B and 4C.

In various embodiments, upper internal grid stiffeners 350a may extend from upper skin portion 340a. Upper longitudinal grid stiffeners 350a-1 may further extend into upper front spar 320a. In some embodiments upper longitudinal grid stiffeners 350a-1 may also extend into upper rear spar 330a. Upper latitudinal grid stiffeners 350a-2 may extend from upper wing attachment plate 370a at wing end 309 toward tip end 308 of torque box 200. In some embodiments, upper latitudinal grid stiffeners 350a-2 may extend into upper wing attachment plate 370a. Similarly, in various embodiments, lower internal grid stiffeners 350b may extend from lower skin portion 340b. Lower longitudinal grid stiffeners 350b-1 may further extend into lower front spar 320b. In some embodiments lower longitudinal grid stiffeners 350b-1 also extend into lower rear spar 330b. Lower latitudinal grid stiffeners 350b-2 may extend from lower wing attachment plate 370b at wing end 309 toward tip end 308 of torque box 200. In some embodiments, lower latitudinal grid stiffeners 350b-2 extend into lower wing attachment plate 370b, as can be seen in FIGS. 3C and 3D. In embodiments, where torque box 200 includes vertical surfaces at tip end 308, upper latitudinal grid stiffeners 350a-2 and lower latitudinal grid stiffeners 350b-2 may additionally extend into such vertical surfaces. As shown in FIG. 4A, some or all of upper lateral grid stiffeners 350a-2 and/or lower lateral grid stiffeners 350b-2 may continually extend from wing end 309 to tip end 308.

In various embodiments, internal grid stiffeners 350a and 350b provide structural support to torque box 200 and skin portions 340a and 340b. Orthogrid structures, such as internal grid stiffeners 350a and 350b depicted in FIGS. 4A-4C, retain rigidity while saving material and therefore weight. Triangularly arranged isogrid stiffeners may similarly retain rigidity and reduce weight. Isogrid stiffeners may act as an isotropic material with equal properties measured in any direction.

In some embodiments, the hollow space of cavity 300 is further defined by stiffener ends 352 of upper internal grid stiffeners 350a and lower internal grid stiffeners 350b. Height 302 of cavity 300 is the distance between the inner surface of upper skin portion 340a to the inner surface of lower skin portion 340b. In some embodiments, height 302 may vary at different locations within cavity 300 depending on the curvature of skin portions 340a and 340b at various points along torque box 200. Height 354a of upper internal grid stiffeners 350a is defined by the distance between the inner surface of upper skin portion 340a to the ends 352 of upper internal grid stiffeners 350a. Similarly, height 354b of lower internal grid stiffeners 350b are defined by the distance between the inner surface of lower skin portion 340b and the ends 352 of lower internal grid stiffeners 350b. In some embodiments, each internal grid stiffener 350a or 350b may have a uniform height 354a or 354b, respectively, throughout torque box 200. In other embodiments, the height 354a or 354h may vary along each internal grid stiffener 350a and/or 350b. In some embodiments, all internal grid stiffeners 350a and 350b may have a uniform height 354a or 354b. In other embodiments, heights 354a and 354b may vary among internal grid stiffeners 350a and 350b. In some embodiments, height 302 of cavity 300 is greater than height 354a of upper internal grid stiffeners 350a and/or height 354b of lower internal grid stiffeners 350b. As depicted in FIGS. 4B-4C, height 302 of cavity 300 is greater than the combined heights 354a and 354b of internal grid stiffeners 350a and 350b.

In addition to reducing weight, as previously described, cavity 300 may further allow repairs and inspections to be conducted more easily by allowing a robotic arm mechanism or other autonomous device to access the interior torque box 200. This may further eliminate the need for a mechanic to enter into or access interior of wingtip 125. This, in turn, allows for the elimination of access ports at the bottom and/or top of wing 125, which provides for a lighter and more simplified structure because less components are needed and the skin of the wing is not pierced or interrupted by access ports. Additionally, wingtip 125 can be constructed with a thinner profile with a shallower depth, providing less drag and improved performance overall for wing 120.

Exterior Structures of a Wingtip Torque Box

Figure 5:
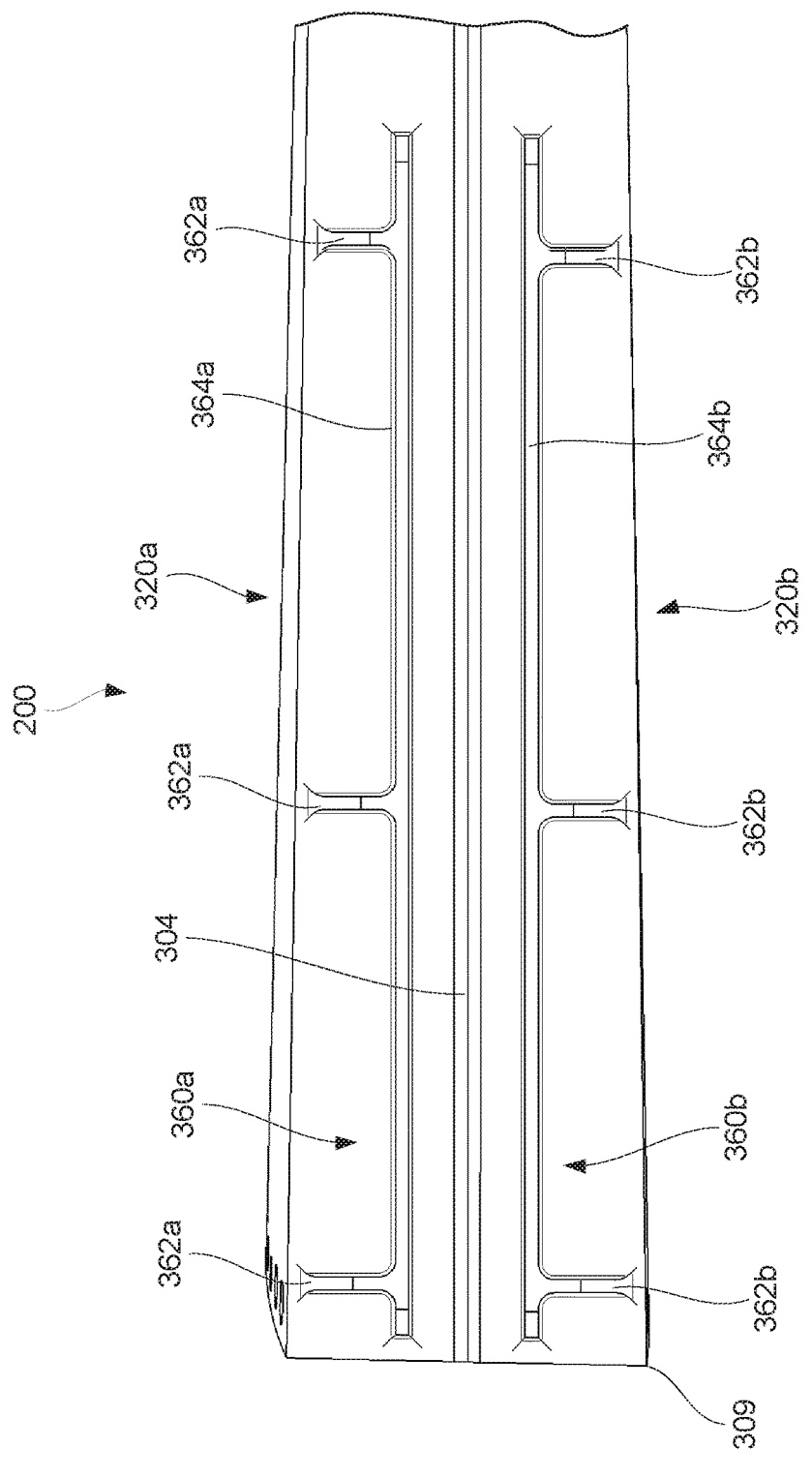
FIG. 5 is a schematic front view of a portion of a wingtip torque box of an upper front spar and a lower front spar with external stiffeners, in accordance with some embodiments.

FIG. 5 is a schematic front view of a portion of torque box 200 showing upper front spar 320a having upper external stiffeners 360a and lower front spar 320b having lower external stiffeners 360b, in accordance with some embodiments. Specifically, upper clamshell 310a may include upper external stiffeners 360a comprising protrusions extending from upper front spar 320a away from the cavity 300. Correspondingly, lower clamshell 310b may also include lower external stiffeners 360b comprising protrusions extending from lower front spar 320b away from cavity 300.

In some embodiments, upper external stiffeners 360a comprise one or more upper vertical portions 362a that extend perpendicularly to front friction stir welded joint 304. Lower external stiffeners 360a may similarly comprise one or more lower vertical portions 362b that extend perpendicularly to front friction stir welded joint 304. As depicted in FIG. 5 each clamshell 310a and 310b includes three vertical portions 362a and 362b, respectively. One or more of upper vertical portions 362a may be collinear to one or more lower vertical portions 360b. In other embodiments, torque box 200 may include more or fewer vertical portions 362a and/or 362b than shown in FIG. 5.

In some embodiments upper external stiffeners 360a may further comprise upper horizontal portion 364a extending parallel to front friction stir welded join 304. Correspondingly, lower external stiffeners 360b may also further comprise lower horizontal portion 364b extending parallel to front friction stir welded join 304. As depicted in FIG. 5, upper horizontal portion 364a bridges three upper vertical portions 362a, and lower horizontal portion 364b bridges three lower vertical portions 364b. In some embodiments, torque box 200 may include more horizontal portions 364a and/or 364b than shown in FIG. 5.

In various embodiments, external stiffeners 360a and 360b may increase the structural strength of torque box 200, and particularly at the attachment point of wing attachment plates 370a and 370b to internal structures of wing 120, such as internal wing structures 210. Because external stiffeners, such as external stiffeners 360a and 360b, are a solid continuous portion of a monolithic clamshell, such as 310a and 310b, external stiffeners 360a or 360b may require less material than traditionally used support structures, while maintaining similar support strength. Furthermore, because less material is used, external stiffeners 360a and 360b may be lighter and more cost efficient than traditionally used support structures.

In other embodiments, external stiffeners 360a and 360b may act as an attachment point for various internal structures, such as leading edge ribs 225a and trailing edge ribs 225b, and/or external structures forming airfoil profiles 230a and 230b. In some embodiments, various internal and external structures may attach onto other portions of front spars 320a and 320b and/or rear spars 330a and 330b.

Figure 6:
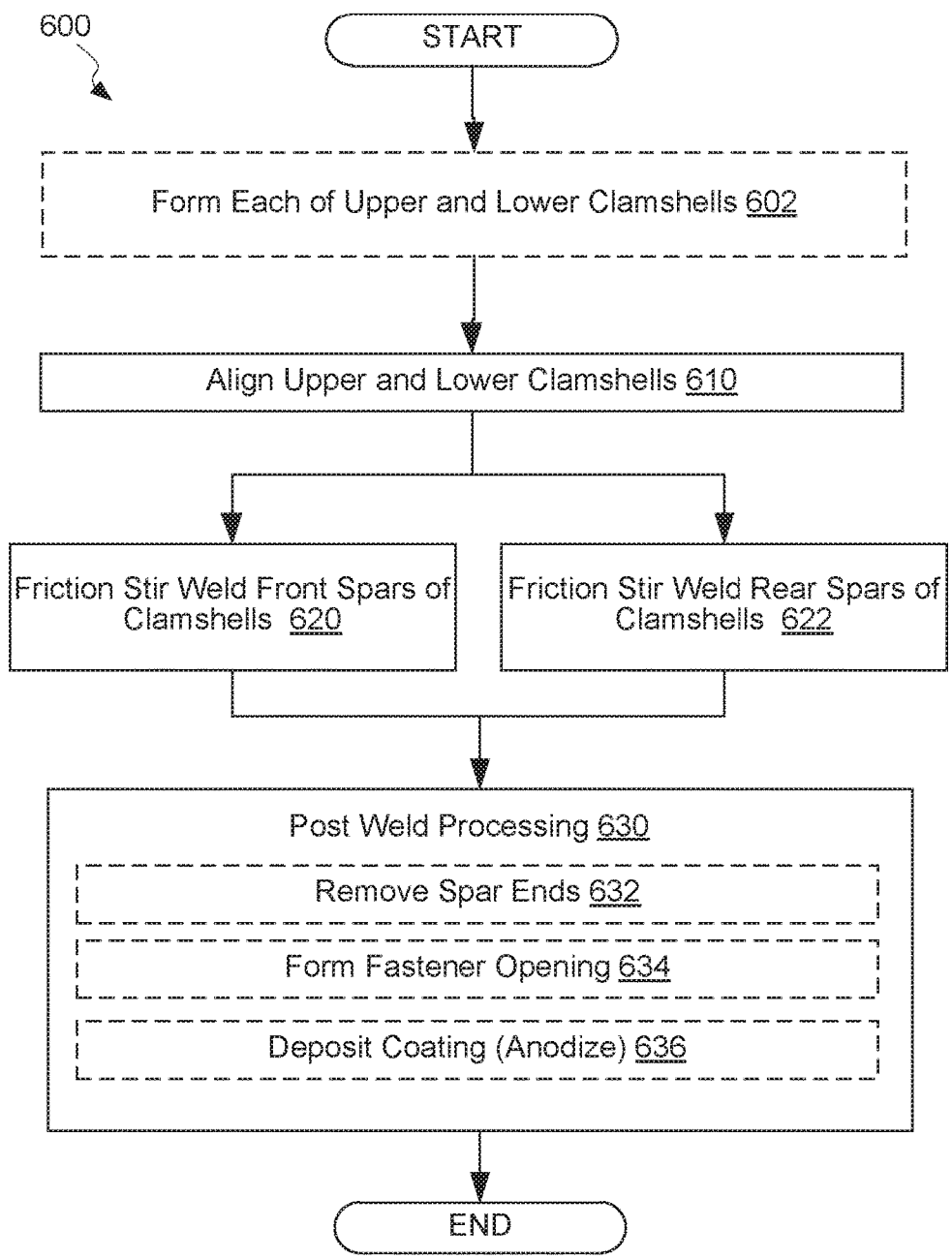
FIG. 6 is a process flowchart corresponding to a method for fabricating a wingtip torque box using friction stir welded monolithic clamshells, in accordance with some embodiments.

Fabricating Examples of a Wingtip Torque Box Using Friction Stir Welding of Monolithic Clamshells FIG. 6 is a process flowchart corresponding to method 600 for fabricating a wingtip torque box using friction stir welded monolithic clamshells, in accordance with some embodiments. Various examples of the wingtip torque box are described above. In various embodiments, method 600 may be implemented as a specific portion of process 900 described below with reference to FIG. 9, such as at least operations 904, 908, and 910. Dashed lines within FIG. 6 indicate optional operations and/or components to method 600.

At operation 602, each of upper clamshell 310a and lower clamshell 310b are formed. For example, each of upper clamshell 310a and lower clamshell 310b may be machined from a single metal block. In some embodiments, upper clamshell 310a and lower clamshell 310b are each monolithic structures. As previously described, upper clamshell 310a may comprise upper front spar 320a, upper rear spar 330a, and upper skin portion 340a extending between upper front spar 320a and upper rear spar 330a. Similarly, lower clamshell 310a may comprise lower front spar 320b, lower rear spar 330b, and lower skin portion 340b extending between lower front spar 320b and lower rear spar 330b.

At operation 610, upper clamshell 310a and lower clamshell 310b are aligned relative to each other. In some embodiments, upper clamshell 310a and lower clamshell 310b are aligned such that upper front spar 320a contacts lower front spar 320b at all locations between wing end 309 and tip end 308 forming a butt configuration. Upper clamshell 310a and lower clamshell 310b may further be aligned such that upper rear spar 330a contacts lower rear spar 330b at all locations between wing end 309 and tip end 308 forming another butt configuration. In some embodiments, a cavity, such as cavity 300, may be formed by upper clamshell 310a and lower clamshell 310b after aligning the clamshells 310a and 310b.

At operation 620, front spars 320a and 320b are friction stir welded. In some embodiments, the friction stir welding of front spars 320a and 320b forms a front friction stir welded joint 304 that extends between wing end 309 and tip end 308 of torque box 200. At operation 622, rear spars 330a and 330b are friction stir welded. In some embodiments, the friction stir welding of rear spars 330a and 330b forms a rear friction stir welded joint 306 that extends between wing end 309 and tip end 308 of torque box 200. As previously described in FIGS. 3A-3D, friction stir welding is performed by a friction stir welding tool. Welding may be initiated by first plunging the rotating probe into front spars 320a and 320b of upper clamshell 310a and lower clamshell 310b, respectively, until the shoulder is in close contact with the top surface of front spars 320a and 320b. Friction heat generated is generated as the rotating shoulder unit rubs on the top surface of front spars 320a and 320b under an applied force in order to soften the material at front spars 320a and 320b. As the rotating tool is propelled forward, the softened material is transported across the bondline causing material from upper front spar 320a to blend with material from lower front spar 320b and facilitating the joint, such as front friction stir welded joint 304. Rear friction stir welded joint 306 may be formed by the same process by applying the friction stir welding tool at the butt configuration formed by rear spars 330a and 330b.

In some embodiments, friction stir welding at operations 620 and 622 may be performed in sequence. In other embodiments, friction stir welding at operation 620 may at least partially overlap in time with friction stir welding at operation 622. In yet other embodiments, friction stir welding at operations 620 and 622 may occur simultaneously. In some embodiments, welding in operations 620 and/or 622 may occur from tip end 308 to wing end 309. In other embodiments, welding in operations 620 and/or 622 may occur from wing end 309 to tip end 308. In some embodiments, wingtip torque box 200 is a monolithic structure after front spars 320a and 320b are friction stir welded at operation 620 and/or after rear spars 330a and 330b are friction stir welded at operation 630.

In various embodiments, post weld processing operations are implemented at operation 630. In some embodiments, post weld processing operations may include removing spar ends at operation 632, forming fastener openings at operation 634, and/or depositing a coating (anodizing) at operation 636. In other embodiments, other post weld processing operations may be performed at operation 630.

Figure 7A:
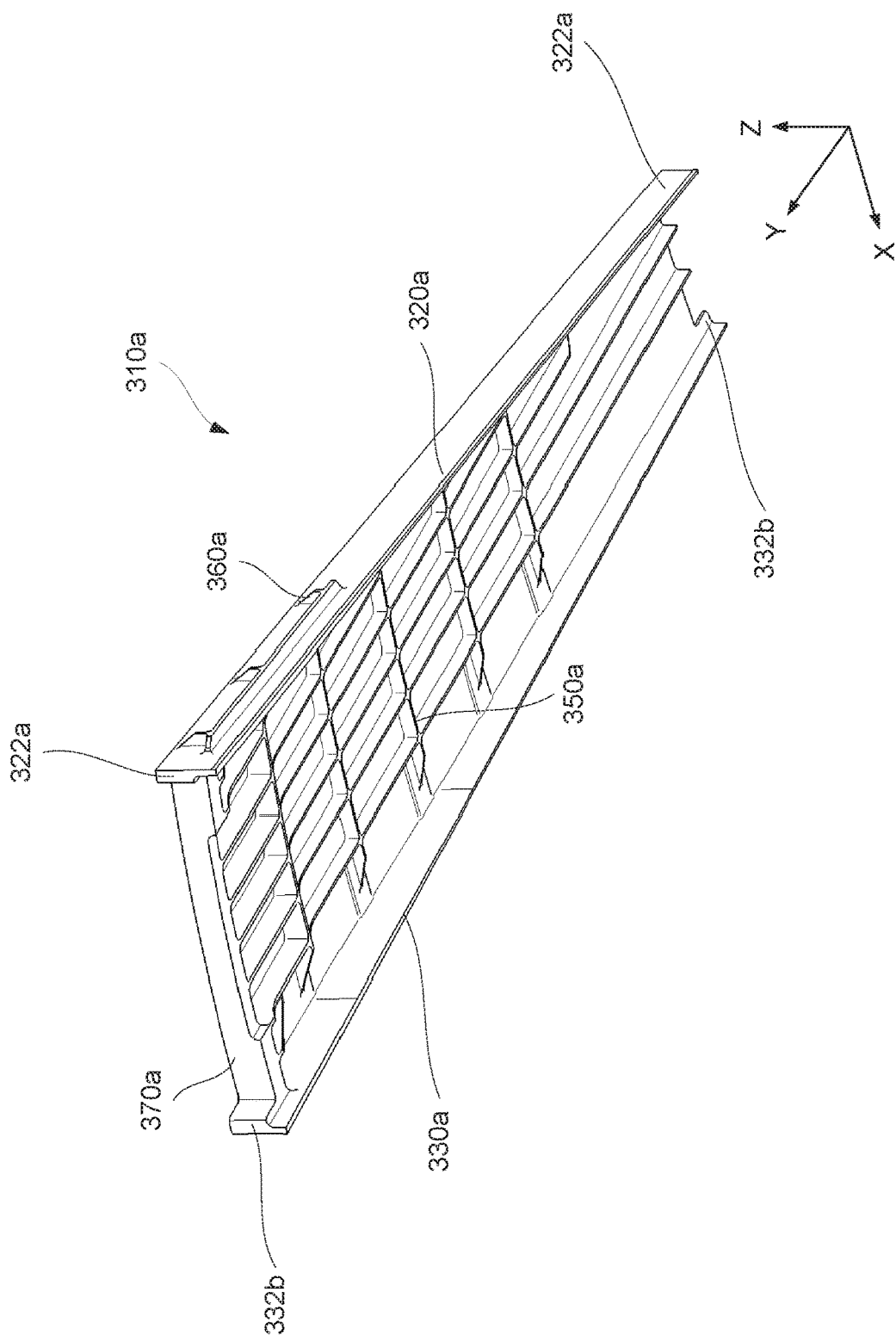
FIG. 7A is a schematic perspective view of an upper clamshell of a wingtip torque box, in accordance with some embodiments.
Figure 7B:
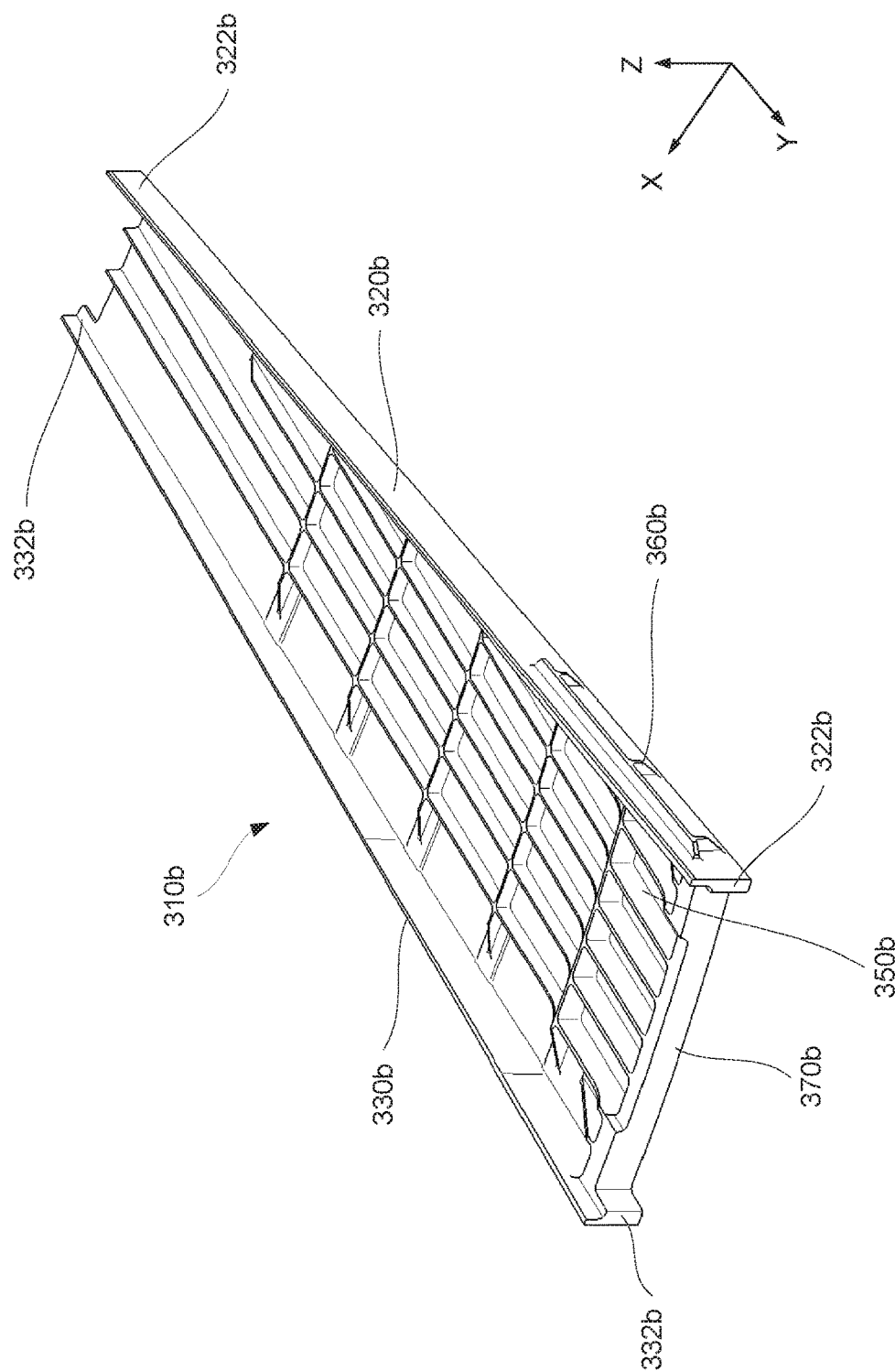
FIG. 7B is a schematic perspective view of a lower clamshell of wingtip torque box, in accordance with some embodiments.

For example, after friction stir welding processes in operations 620 and/or 622 are completed, one or more ends of spars 320a, 320b, 330a, and/or 330b may be removed during operation 632. Because the material of each part to be joined, such as clamshells 310a and 310b, is softened and shifted during the friction stir welding process, joined parts may include excess material at the beginning and/or end of a path taken by the probe of a friction stir welding device to maintains excess material at the beginning and/or end of the friction stir welded joint, such as 304 or 306, in order to ensure welding consistency. In some embodiments, such path corresponds to a friction stir welded joint, such as 304 and/or 306. FIGS. 7A-7B depict upper clamshell 310a and lower clamshell 310b, respectively, before the two parts are friction stir welded together, showing spar ends comprising such excess material for friction stir welding operations. FIG. 7A is a schematic view of the interior of upper clamshell 310a of a wingtip torque box 200, in accordance with some embodiments. FIG. 7B is a schematic view of the interior of lower clamshell 310b of a wingtip torque box 200, in accordance with some embodiments. For example, upper clamshell 310a may include upper front spar ends 322.a protruding from upper front spar 320a at wing end 309 and tip end 308. Upper clamshell 310a may further include upper rear spar ends 332b protruding from upper rear spar 330a at wing end 309 and tip end 308. Additionally, lower clamshell 310b may include lower front spar ends 322b protruding from lower front spar 320b at wing end 309 and tip end 308. Lower clamshell 310b may further include lower rear spar ends 332b protruding from lower rear spar 330b at wing end 309 and tip end 308.

Figure 8A:
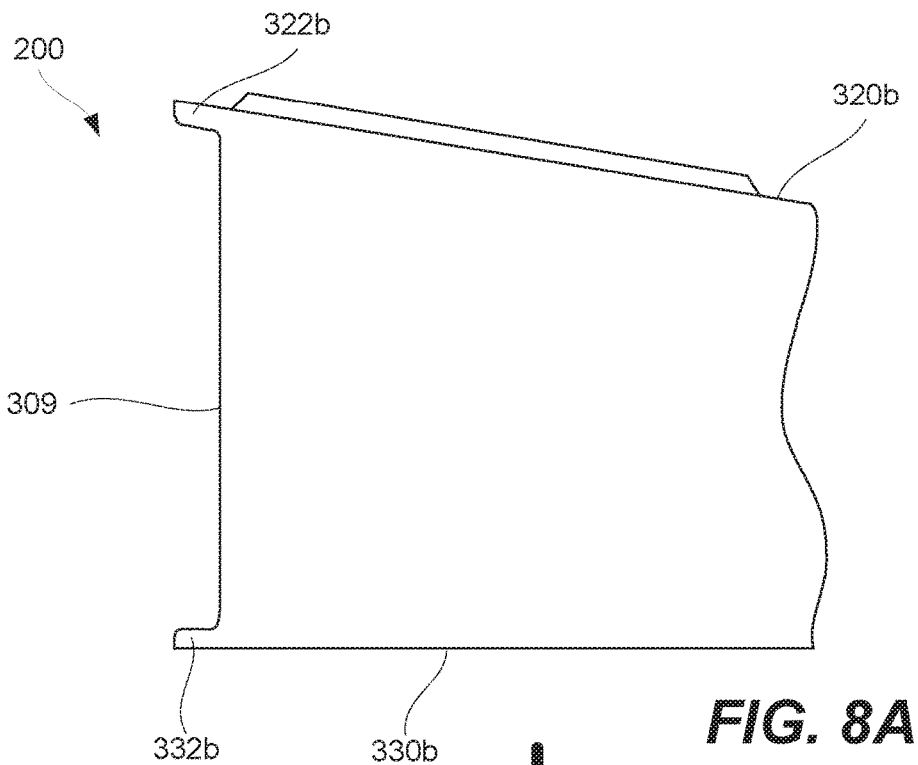
FIGS. 8A and 8B are schematic views of the wing end of a wingtip torque box before and after post weld processing operations, in accordance with some embodiments.
Figure 8B:
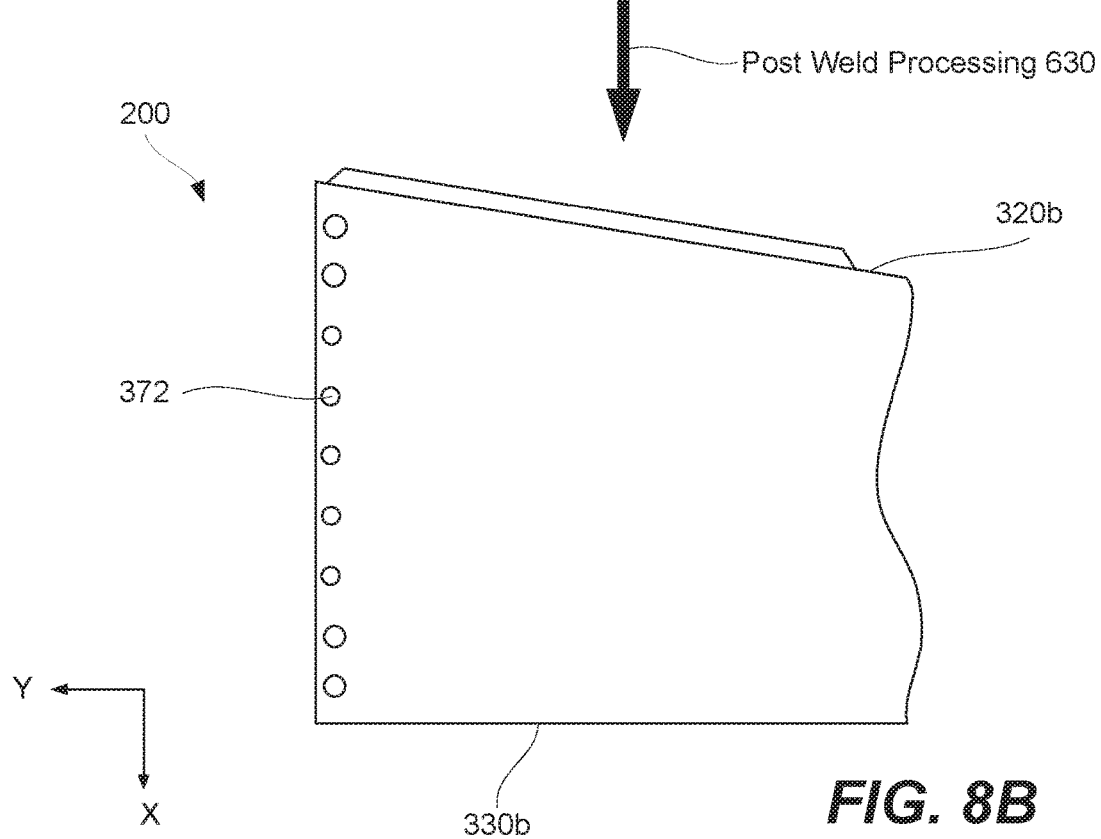

After the friction stir welding operations have been completed at operations 620 and/or 630, there may be extra material remaining corresponding to one or more of spar ends 322a, 322b, 332a, and/or 332b. In some embodiments, any excess material remaining of spar ends 322a, 322b, 332a, and/or 332b are removed by various mechanical processes, such as turning, grinding, welding, burning laser, flame, plasma, water jet cutting, etc. For example, the remaining material may be cut off with a saw, chisel, shears, laser, or other cutter. Spar ends 322a, 322b, 332a, and/or 332b may also be removed by grinding the remaining material off, such as with a sander or other grinding machine. In other embodiments, other metal processing methods may be implemented to remove ends at operation 632. In some embodiments, one or more ends are removed such that the cut and/or ground surfaces are flush with the rest of wing end 309 and/or tip end 308 of torque box 200, such as in FIGS. 3A-3D. Another example of torque box 200 with and without spar ends is depicted below in FIGS. 8A-8B. FIG. 8A depicts wing end 309 of lower clamshell 310b with lower front spar end 322b and lower rear spar end 332b. FIG. 8B depicts wing end 309 of lower clamshell 310b with lower front spar end 322b and lower rear spar end 332 removed. The cut and/or ground surfaces may further be polished or sanded to achieve a smooth surface finish. For example, spar ends 322a, 322b, 332a, and 332b may be removed and smoothed such that front spars 320a and 320b, and rear spars 330a and 330b, are flush with upper wing attachment plate 370a and lower wing attachment plate 370b, as depicted in FIG. 3D.

Referring again to post weld processing operations at operation 630 in FIG. 6, one or more fastener openings 372 may be formed during operation 634 after friction stir welding processes in operations 620 and/or 622 are completed. In some embodiments, the formed fastener openings may be lateral fastener openings 372a and vertical fastener openings 372b, as previously described in FIG. 3D. In various embodiments, fastener openings 372 may be formed by drilling or other cutting mechanisms, such as drills, lasers, water jet, etc. Another example of torque box 200 with formed fastener openings 372 is depicted in FIG. 8B.

After friction stir welding processes in operations 620 and 622 are completed, a coating may be deposited around wingtip torque box 200 during operation 636. In some embodiments depositing a coating may be performed by anodizing torque box 200 through an electrolytic passivation process that increases the thickness of the natural oxide layer on the surface of metal parts, such as torque box 200, thereby creating a corrosion and wear resistant layer around torque box 200. In some embodiments, colored dyes may be added during the anodizing process of operation 636 in order to apply a desired color to torque box 200. Operation 636 may further include implementing a sealing process to achieve corrosion resistance of the porous anodized surface. In other embodiments, depositing a coating at operation 636 may include using other coating processes, such as painting or applying other material around the surface of torque box 200.

FIGS. 8A and 8B are schematic views of the wing end of a wingtip torque box before and after post weld processing operations, in accordance with some embodiments. FIG. 8A depicts wing end 309 of torque box 200 prior to post weld processing operations, such as in operation 630. FIG. 8B depicts wing end 309 of torque box 200 after post weld processing operations, such as in operation 630. Because upper clamshell 310a and lower clamshell 310b are mirror image enantiomorphs (as previously described), FIGS. 8A and 8B may depict either a top view or a bottom view of wing end 309 of torque box 200, and associated components and/or elements. However, FIGS. 8A-8B will be considered to be a bottom view of lower clamshell 310b for the purposes of describing FIGS. 8A-8B.

As depicted in FIG. 8A, lower clamshell 310b includes lower front spar end 322b extending from lower front spar 320a out toward wing end 309. Similarly, lower clamshell 310 further includes lower rear spar end 332b extending from lower rear spar 330b out toward wing end 309. After the friction stir welding during operations 620 and/or 622, any portion of spar end 322a or 322b are removed in post weld processing operations at operation 630, such as operation 632, previously described above. FIG. 8B depicts torque box 200 with spar ends 322b and 332b removed by post weld processing operation 632 such that lower front spar 320b and lower rear spar 330b are flush with lower wing attachment plate 370b at wing end 309. Similarly, spar ends 322a and 332a may be removed by post weld processing operation 632 such that upper front spar 320a and upper rear spar 330a are flush with upper wing attachment plate 370a at wing end 309. FIG. 8B further depicts torque box 200 with fastener openings 372 formed at post weld processing operation 634. Specifically shown are vertical openings 376 formed in lower wing attachment plate 370b of lower clamshell 310b.

Examples of Aircraft and Methods of Fabricating and Operating Aircraft

Figure 9:
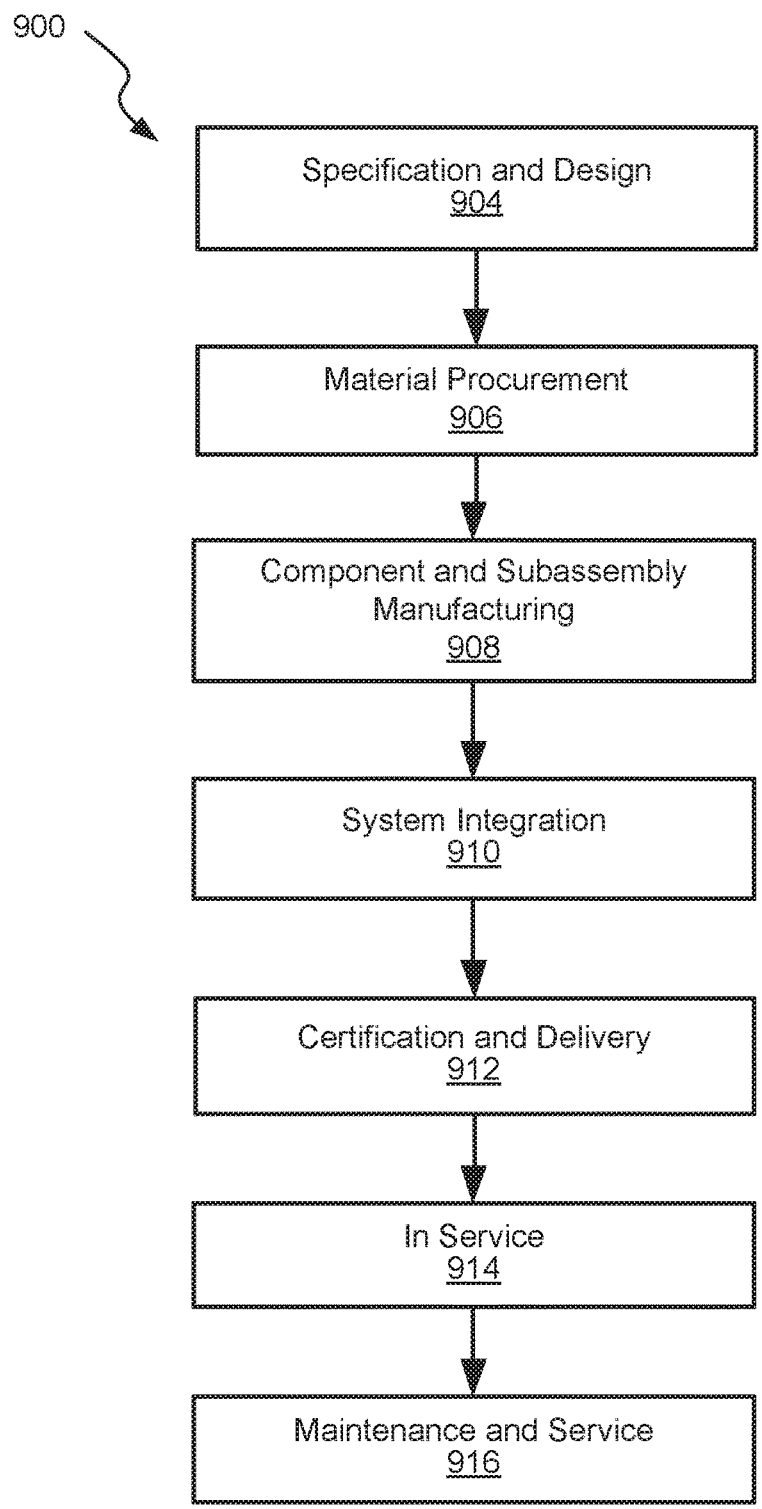
FIG. 9 is a block diagram of aircraft production and service methodology that may utilize methods and assemblies described herein.

Examples of the present disclosure may be described in the context of aircraft manufacturing and service method 900 as shown in FIG. 9 and aircraft 100 as shown in FIG. 1. During pre-production, illustrative method 900 may include specification and design (block 904) of aircraft 100 and material procurement (block 906). During production, component and subassembly manufacturing (block 908) and inspection system integration (block 910) of aircraft 100 may take place. Described methods and assemblies formed by these methods and including torque box 200 can be used in any of specification and design (block 904) of aircraft 100, material procurement (block 906), component and subassembly manufacturing (block 908), and/or inspection system integration (block 910) of aircraft 100.

Thereafter, aircraft 100 may go through certification and delivery (block 912) to be placed in service (block 914). While in service, aircraft 100 may be scheduled for routine maintenance and service (block 916). Routine maintenance and service may include modification, reconfiguration, refurbishment, etc. of one or more inspection systems of aircraft 100. Described methods and assemblies formed by these methods and including torque box 200 can be used in any of certification and delivery (block 912), service (block 914), and/or routine maintenance and service (block 916).

Each of the processes of illustrative method 900 may be performed or carried out by an inspection system integrator, a third party, and/or an operator (e.g., a customer). For the purposes of this description, an inspection system integrator may include, without limitation, any number of aircraft manufacturers and major-inspection system subcontractors; a third party may include, without limitation, any number of vendors, subcontractors, and suppliers; and an operator may be an airline, leasing company, military entity, service organization, and so on.

As shown in FIG. 1, aircraft 100 produced by illustrative method 900 may include airframe 150 with an interior 170. As previously described, aircraft 100 further includes wings 120 coupled to airframe 150, with engines 130 coupled to wings 120. Airframe 150 further includes a number of high-level inspection systems such as electrical inspection system 140 and environmental inspection system 160. Any number of other inspection systems may be included. Although an aerospace example is shown, the principles disclosed herein may be applied to other industries, such as the automotive industry. Accordingly, in addition to aircraft 100, the principles disclosed herein may apply to other vehicles, e.g., land vehicles, marine vehicles, space vehicles, etc.

Apparatus(es) and method(s) shown or described herein may be employed during any one or more of the stages of manufacturing and service method (illustrative method 900). For example, components or subassemblies corresponding to component and subassembly manufacturing (block 908) may be fabricated or manufactured in a manner similar to components or subassemblies produced while aircraft 100 is in service (block 914). Also, one or more examples of the apparatus(es), method(s), or combination thereof may be utilized during production stages (block 908) and (block 910); for example, by substantially expediting assembly of or reducing the cost of aircraft 100. Similarly, one or more examples of the apparatus or method realizations, or a combination thereof, may be utilized, for example and without limitation, while aircraft 100 is in service (block 914) and/or during maintenance and service (block 916).

CONCLUSION

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the

What is claimed is:

1. A wingtip torque box comprising:
an upper monolithic clamshell comprising an upper front spar, an upper rear spar, and an upper skin portion extending between the upper front spar and the upper rear spar;
a lower monolithic clamshell comprising a lower front spar, a lower rear spar, and a lower skin portion extending between the lower front spar and the lower rear spar,
wherein the upper monolithic clamshell and the lower monolithic clamshell form a cavity,
wherein the cavity is a continuous cavity that extends between a wing end and a tip end of the wingtip torque box, providing access through the wingtip torque box between the wing end and the tip end,
wherein the upper front spar is friction stir welded to the lower front spar at a front friction stir welded joint, and
wherein the upper rear spar is friction stir welded to the lower rear spar at a rear friction stir welded joint.

2. The wingtip torque box of claim 1, wherein the upper monolithic clamshell comprises upper internal grid stiffeners extending from the upper skin portion to the cavity, and wherein the lower monolithic clamshell comprises lower internal grid stiffeners extending from the lower skin portion to the cavity, the cavity defined by ends of the upper internal grid stiffeners and the lower internal grid stiffeners.

3. The wingtip torque box of claim 2, wherein the cavity has a height greater than a height of the upper internal grid stiffeners or a height of the lower internal grid stiffeners.

4. The wingtip torque box of claim 2, wherein the upper internal grid stiffeners and the lower internal grid stiffeners are both orthogrid stiffeners.

5. The wingtip torque box of claim 2, wherein the upper internal grid stiffeners and the lower internal grid stiffeners extend between a tip end and a wing end of the wingtip torque box.

6. The wingtip torque box of claim 1, wherein the upper monolithic clamshell comprises upper external stiffeners extending from the upper front spar away from the cavity, wherein the lower monolithic clamshell comprises lower external stiffeners extending from the lower front spar away from the cavity.

7. The wingtip torque box of claim 6, wherein the upper external stiffeners comprise upper vertical portions extending perpendicular to the front friction stir welded joint, and wherein the lower external stiffeners comprise lower vertical portions extending perpendicular to the front friction stir welded joint.

8. The wingtip torque box of claim 1, wherein the upper skin portion and the lower skin portion define an airfoil shape of the wingtip torque box.

9. The wingtip torque box of claim 1, wherein the upper monolithic clamshell comprises an upper wing attachment plate, wherein the lower monolithic clamshell comprises a lower wing attachment plate, and wherein each of the upper wing attachment plate and the lower wing attachment plate comprises fastener openings.

10. The wingtip torque box of claim 9,
wherein each of the fastener openings comprises a first cylindrical opening extending substantially perpendicular to a plane defined by the upper wing attachment plate or by the lower wing attachment plate,
wherein each of the fastener openings further comprises a second cylindrical opening extending substantially perpendicular to a plane defined by the upper skin portion or by the lower skin portion.

11. The wingtip torque box of claim 9, wherein the upper wing attachment plate and the lower wing attachment plate are coplanar.

12. The wingtip torque box of claim 9, wherein the upper wing attachment plate and the lower wing attachment plate are substantially perpendicular to the front friction stir welded joint and to the rear friction stir welded joint.

13. The wingtip torque box of claim 1, wherein the wingtip torque box comprises aluminum.

14. The wingtip torque box of claim 1, wherein a material composition of the wingtip torque box is substantially uniform throughout an entire volume of the wingtip torque box.

15. A method of fabricating a wingtip torque box, the method comprising:
aligning an upper monolithic clamshell and a lower monolithic clamshell relative to each other,
wherein the upper monolithic clamshell comprises an upper front spar, an upper rear spar, and an upper skin portion extending between the upper front spar and the upper rear spar;
wherein the lower monolithic clamshell comprises a lower front spar, a lower rear spar, and a lower skin portion extending between the lower front spar and the lower rear spar,
friction stir welding the upper front spar and the lower front spar thereby forming a front friction stir welded joint extending between the wing end and the tip end; and
friction stir welding the upper rear spar and the lower rear spar thereby forming a rear friction stir welded joint extending between the wing end and the tip end,
wherein the upper monolithic clamshell and the lower monolithic clamshell form a cavity,
wherein the cavity is a continuous cavity that extends between a wing end and a tip end of the wingtip torque box, providing access through the wingtip torque box between the wing end and the tip end.

16. The method of claim 15, wherein friction stir welding the upper front spar and the lower front spar and friction stir welding the upper rear spar and the lower rear spar are performed in sequence.

17. The method of claim 15, wherein friction stir welding the upper front spar and the lower front spar at least partially overlaps in time with friction stir welding the upper rear spar and the lower rear spar.

18. The method of claim 15, further comprising, after friction stir welding the upper front spar and the lower front spar, removing an end of the upper front spar and an end of the lower front spar corresponding to a path end of friction stir welding.

19. The method of claim 15, further comprising forming fastener openings in an upper wing attachment plate of the upper monolithic clamshell and in a lower wing attachment plate of the lower monolithic clamshell.

20. The method of claim 15, further comprising, after friction stir weld anodizing the wingtip torque box.

21. The wingtip torque box of claim 7, wherein each of the upper vertical portions is collinear to one of the lower vertical portions.

* * * * *